US012700202B2

(12) United States Patent
Burkhart et al.

(10) Patent No.: US 12,700,202 B2
(45) Date of Patent: Aug. 4, 2026

(54) METHODS, STORAGE MEDIA, AND SYSTEMS FOR GENERATING A THREE-DIMENSIONAL COORDINATE SYSTEM

(71) Applicant: Hover Inc., San Francisco, CA (US)

(72) Inventors: Jacob Burkhart, San Francisco, CA (US); Yevheniia Dzitsiuk, San Francisco, CA (US); Weien Ting, Poway, CA (US); Matthew Thomas, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 147 days.

(21) Appl. No.: 18/297,227

(22) Filed: Apr. 7, 2023

(65) Prior Publication Data

US 2023/0334810 A1 Oct. 19, 2023

Related U.S. Application Data

(60) Provisional application No. 63/494,855, filed on Apr. 7, 2023, provisional application No. 63/402,831, filed on Aug. 31, 2022, provisional application No. 63/402,818, filed on Aug. 31, 2022, provisional application No. 63/331,138, filed on Apr. 14, 2022.

(51) Int. Cl.
*G06T 19/20* (2011.01)
*G06T 15/10* (2011.01)
*G06T 17/00* (2006.01)

(52) U.S. Cl.
CPC .............. *G06T 19/20* (2013.01); *G06T 15/10* (2013.01); *G06T 17/00* (2013.01); *G06T 2219/2004* (2013.01); *G06T 2219/2016* (2013.01)

(58) Field of Classification Search
CPC ......... G06T 19/20; G06T 15/10; G06T 17/00; G06T 2219/2004; G06T 2219/2016
See application file for complete search history.

(56) References Cited

U.S. PATENT DOCUMENTS

| | | | |
|---|---|---|---|
| 10,997,448 B2 | 5/2021 | Bradski | |
| 2018/0089833 A1* | 3/2018 | Lewis | ........................ G06T 7/12 |
| 2019/0051054 A1* | 2/2019 | Jovanovic | ........... G06F 3/04815 |
| 2019/0260939 A1* | 8/2019 | Gupta | .................... H04N 23/69 |
| 2019/0318482 A1* | 10/2019 | Raag | .................... G06V 20/588 |
| 2019/0385285 A1 | 12/2019 | Chen et al. | |

(Continued)

FOREIGN PATENT DOCUMENTS

| | | | |
|---|---|---|---|
| CA | 3157919 | 9/2021 | |
| CN | 109979206 A * | 7/2019 | ............. G08G 1/054 |

(Continued)

OTHER PUBLICATIONS

Sombekke: Triangulation for Depth Estimation [online], [Retrieved Jan. 15, 2024] Retrieved from the Internet <URL: https://staff.fnwi. uva.nl/a.visser/education/bachelorAI/Honours_Extension_Niels_ Sombekke.pdf> (Year: 2022).*

(Continued)

*Primary Examiner* — King Y Poon
*Assistant Examiner* — Vincent Alexander Providence

(57) ABSTRACT

Methods, storage media, and systems for generating a three-dimensional coordinate system, evaluating quality of camera poses associated with images, scaling a three-dimensional model, and calculating an alignment transformation are disclosed.

20 Claims, 24 Drawing Sheets

(56) References Cited

U.S. PATENT DOCUMENTS

| 2020/0005536 | A1  | 1/2020 | Esteban et al. | |
| 2021/0027529 | A1* | 1/2021 | Matsunobu | H04N 13/117 |
| 2022/0114759 | A1* | 4/2022 | Xia | G06V 10/82 |
| 2022/0257075 | A1* | 8/2022 | Kim | G01C 21/3841 |

FOREIGN PATENT DOCUMENTS

| CN | 110930503 | A | * | 3/2020 | G06F 18/22 |
| CN | 111791235 | A | * | 10/2020 | B25J 9/1697 |
| CN | 115170767 | A | * | 10/2022 | G06T 17/20 |
| WO | WO-2018108215 | A1 | * | 6/2018 | G06V 20/58 |
| WO | WO-2018202258 | A1 | * | 11/2018 | G06T 7/80 |

OTHER PUBLICATIONS

Sadun: Finding the normal to a plane [online], [Retrieved Jan. 15, 2024] Retrieved from the Internet <URL: https://web.archive.org/web/20210413223437/https://web.ma.utexas.edu/users/m408m/Display12-5-4.shtml > (Year: 2021).*
Wikipedia: Cosine similarity [online] [Retrieved Aug. 26, 2025] <URL: https://en.wikipedia.org/w/index.php?title=Cosine_similarity&oldid=1053914647> (Year: 2021).*
EP Search Report dated Mar. 26, 2026 for EP application No. 23788884.7.

* cited by examiner

500

502    504

602

600

METHODS, STORAGE MEDIA, AND SYSTEMS FOR GENERATING A THREE-DIMENSIONAL COORDINATE SYSTEM

CROSS REFERENCE TO RELATED APPLICATIONS

The present application claims priority to U.S. Provisional Application No. 63/494,855 filed Apr. 7, 2023 entitled "METHODS, STORAGE MEDIA, AND SYSTEMS FOR GENERATING A THREE-DIMENSIONAL COORDINATE SYSTEM", U.S. Provisional Application No. 63/402,831 filed on Aug. 31, 2022 entitled "METHODS, STORAGE MEDIA, AND SYSTEMS FOR CALCULATING AN ALIGNMENT TRANSFORMATION", U.S. Provisional Application No. 63/402,818 filed on Aug. 31, 2022 entitled "METHODS, STORAGE MEDIA, AND SYSTEMS FOR CALCULATING AN ALIGNMENT TRANSFORMA-TION", and U.S. Provisional Application No. 63/331,138 filed on Apr. 14, 2022 entitled "METHODS AND SYSTEMS FOR GENERATING A THREE-DIMENSIONAL COORDINATE SYSTEM", each of which are hereby incorporated by reference in their entirety.

BACKGROUND

Field of the Disclosure

The present disclosure relates to methods, storage media, and systems generating a three-dimensional coordinate system, evaluating quality of camera poses associated with images, scaling a three-dimensional model, and calculating an alignment transformation.

Description of the Related Art

Images and associated poses may be captured of an environment. The environment may be an exterior environment, an interior environment, or both. A three-dimensional (3d) model may be generated of the environment based on the images and associated poses.

FIG. 1 illustrates a top-down view of an interior environment 100, according to some embodiments. The environment 100 includes a loveseat 102, an end table 104, a sofa 106, a lounge chair 108, and a coffee table 110. Images and associated poses of the environment 100 may be captured by a capture device. FIG. 1 includes axes 112 of a capture coordinate system 114 where the x-y plane is parallel to a ground plane, and the z-axis is coming out of the page. The images and associated poses of the environment 100 may be associated with the capture coordinate system 114. The capture coordinate system 114 may be generated at a beginning of a capture, for example based on one or more images captured at the beginning of the capture. An origin and the axes 112 of the capture coordinate system 114 may be generated at the beginning of the capture, for example based on one or more poses associated with the one or more images captured at the beginning of the capture.

A 3d model of the environment 100 is generated in the capture coordinate system 114. The environment 100, or objects therein (e.g., the loveseat 102, the end table 104, the sofa 106, the lounge chair 108, or the coffee table 110), may have been observed according to the capture coordinate system 114, but exist in a real-world that is not subjective to the capture device, nor the capture coordinate system 114. Generating a 3d model including 3d representations (e.g., 3d objects, 3d primitives, etc.) of the environment 100, or objects therein, based on the capture coordinate system 114 (i.e., an observed coordinate system) may impute any inconsistencies between the capture coordinate system 114 (i.e., the observed coordinate system) and an actual coordinate system for the environment (i.e., an environment coordinate system). The 3d representations may conform to the limitations of the capture device instead of to the reality of the environment 100, or objects therein. When generating the 3d model of the environment 100 in the capture coordinate system 114, the inconsistencies between the capture coordinate system 114 (i.e., the observed coordinate system) and the actual coordinate system for the environment 100 (i.e., the environment coordinate system) may manifest as misalignments between the capture coordinate system 114 and 3d representations (e.g., 3d objects, 3d primitives, etc.) of the 3d model. The misalignments between the capture coordinate system 114 and the 3d representations of the 3d model may be because the environment 100, or objects therein, for which the 3d representations are being generated are observed in the capture coordinate system 114 but exist in the environment coordinate system. Solutions that address any inconsistencies between the capture coordinate system 114 and the actual coordinate system for the environment are desired.

SUMMARY

One aspect of the present disclosure relates to a method generating a three-dimensional coordinate system. The method may include receiving a first image and an associated first camera pose including a first camera location and a first camera orientation. The method may include receiving a second image and an associated second camera pose including a second camera location and a second camera orientation. The method may include receiving a first point in the first image. The method may include receiving a second point in the second image. The second point may correspond to the first point. The method may include receiving a first two-dimensional line segment in the first image. A first end point of the first 2d line segment may be the first point. The method may include generating a first three-dimensional coordinate system based on the first camera pose. The second camera pose, the first point, the second point, and the first 2d line segment. The method may include generating a 3d line segment based on the first 3d coordinate system and the line segment.

One aspect of the present disclosure relates to a method for evaluating quality of camera poses associated with images. The method may include receiving a first image and an associated first camera pose including a first camera location and a first camera orientation. The method may include receiving a second image and an associated second camera pose including a second camera location and a second camera orientation. The method may include receiving a first two-dimensional line segment in the first image. The first 2d line segment may include a first end point and a second end point. The method may include receiving a second 2d line segment in the second image. The second 2d line segment may include a third end point and a fourth end point. The first end point may correspond to the third end point and the second end point corresponds to the fourth end point. The method may include generating a first three-dimensional coordinate system based on the first camera pose. The second camera pose, the first 2d line segment, and the second 2d line segment. The method may include generating a second 3d coordinate system based on the first camera pose. The second camera pose, the first 2d line segment, and the second 2d line segment. The method may include calculating a score based on the first 3d coordinate system and the second 3d coordinate system.

One aspect of the present disclosure relates to a method scaling a three-dimensional model. The method may include receiving a plurality of images and a plurality of first camera poses associated with the plurality of images. The method may include receiving a three-dimensional model generated based on the plurality of images and a plurality of second camera poses associated with the 3d model. The method may include receiving a 3d line segment of the 3d model. The method may include, for each pair of images in the plurality of images, projecting the 3d line segment onto a first image of the pair of images. The first image may be associated with a first camera pose including a first camera location and a first camera orientation. The method may include, for each pair of images in the plurality of images, defining a first two-dimensional line segment in the first image based on the 3d line segment projected onto the first image. The first 2d line segment may include a first end point and a second end point. The method may include, for each pair of images in the plurality of images, projecting the 3d line segment onto a second image of the pair of images. The second image may be associated with a second camera pose including a second camera location and a second camera orientation. The method may include, for each pair of images in the plurality of images, defining a second 2d line segment in the second image based on the 3d line segment projected onto the second image. The second 2d line segment may include a third end point and a fourth end point. The first end point may correspond to the third end point and the second end point corresponds to the fourth end point. The method may include, for each pair of images in the plurality of images, generating a first three-dimensional coordinate system based on a first camera pose of the first camera poses associated with the first image, a second camera pose of the first camera poses associated with the second image, the first 2d line segment, and the second 2d line segment. The method may include, for each pair of images in the plurality of images, generating a second 3d coordinate system based on the first camera pose of the first camera poses, the second camera pose of the first camera poses, the first 2d line segment, and the second 2d line segment. The method may include, for each pair of images in the plurality of images, calculating a scaling factor based on the first 3d coordinate system, the second 3d coordinate system, and the 3d line segment. The method may include, for each pair of images in the plurality of images, calculating a score based on the scaling factor. The scaling factor may be associated with the score. The method may include comparing the scores of the pairs of images. The method may include selecting a score of the scores of the pairs of images based on the comparison. The method may include scaling the 3d model using a scaling factor associated with the selected score.

One aspect of the present disclosure relates to a method for calculating an alignment transformation. The method may include receiving a plurality of images and a plurality of poses associated with the plurality of images. The method may include, for an image of the plurality of images: detecting 2d geometry in the image, generating 3d geometry for the image based on the 2d geometry, rotating the 3d geometry to align the 3d geometry with the 2d geometry, and calculating an alignment transformation based on the rotation. The method may include, applying the alignment transformation to the plurality of poses to generate a plurality of modified poses.

One aspect of the present disclosure relates to a method for calculating an alignment transformation. The method may include receiving a plurality of images and a plurality of poses associated with the plurality of images. The method may include receiving a plurality of 3d content associated with the plurality of images and a plurality of rotation matrices associated with the plurality of 3d content. The method may include calculating an alignment transformation based on the plurality of rotation matrices. Calculating the alignment transformation may include calculating a dominant normal vector based on a plurality of normal vectors of the plurality of rotation matrices, calculating a cross product between a dominant gravity vector and the dominant normal vector to define an inverse alignment transformation, and calculating an inverse of the inverse alignment transformation to define the alignment transformation. The method may include applying the alignment transformation to the plurality of poses to generate a plurality of modified poses.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Images and associated poses may be captured of an environment. The environment may be an exterior environment, an interior environment, or both. A three-dimensional (3d) model may be generated of the environment based on the images and associated poses.

Figure 1:
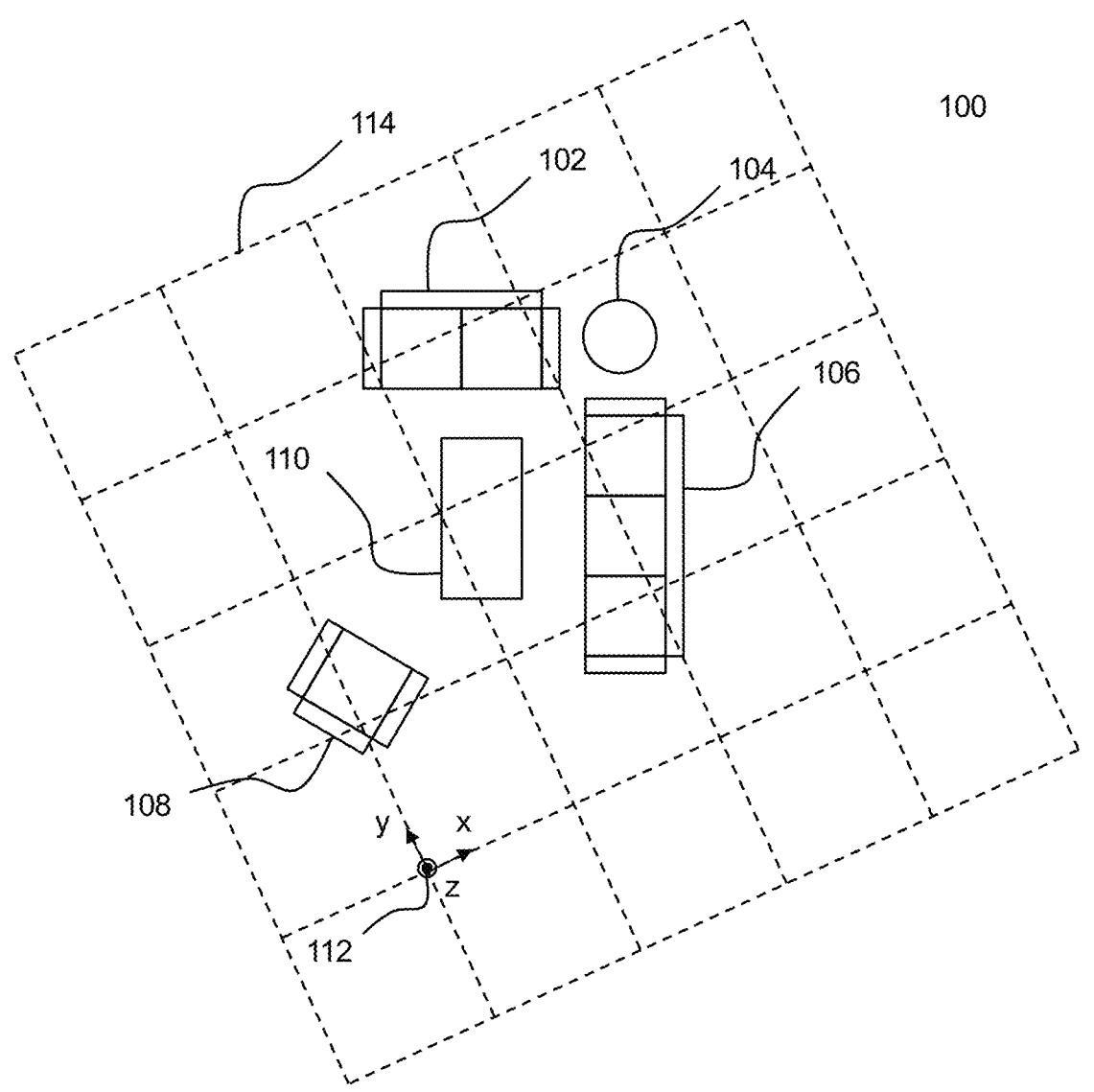
FIG. 1 illustrates a top-down view of an environment, according to some embodiments.
Figure 2:
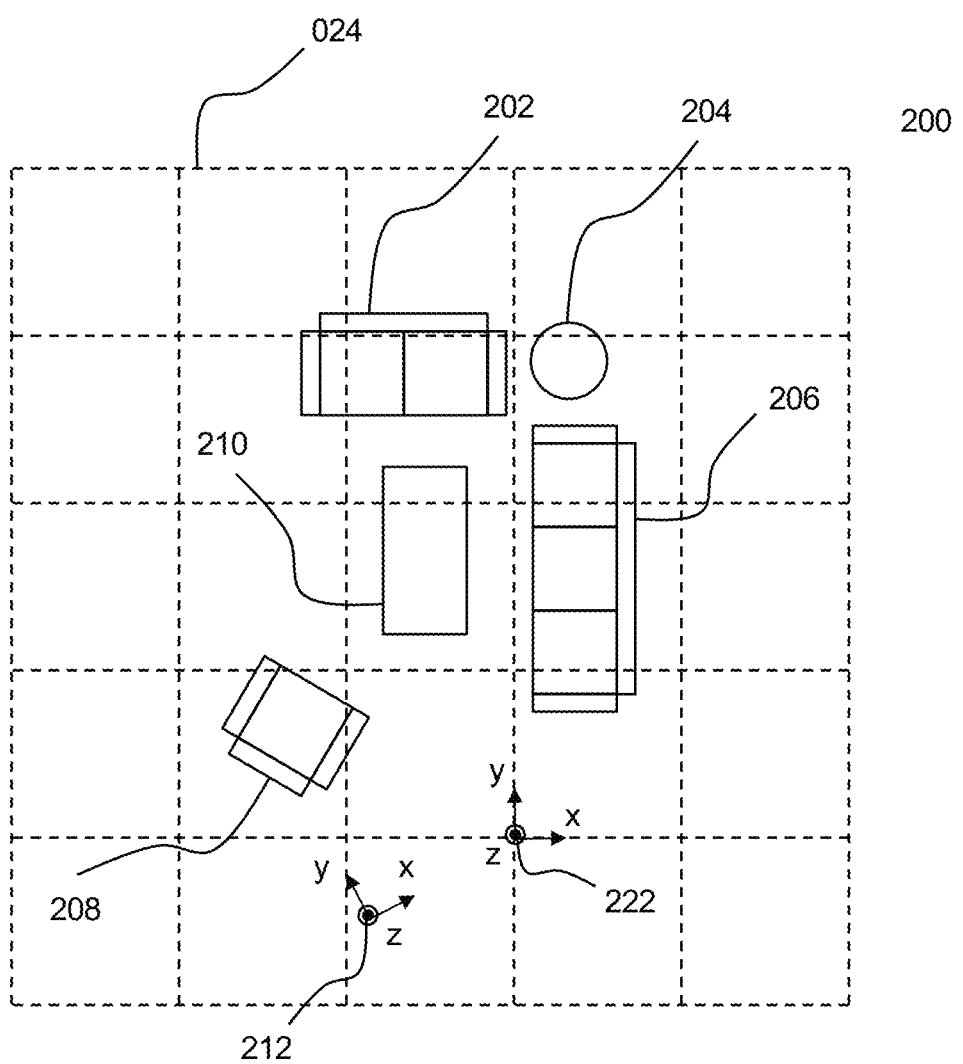
FIG. 2 illustrates a top-down view of an environment, according to some embodiments.

FIG. 2 illustrates a top-down view of an interior environment 200, according to some embodiments. The environment 200 includes a loveseat 202, an end table 204, a sofa 206, a lounge chair 208, and a coffee table 210. FIG. 2 includes axes 212 of a capture coordinate system (not illustrated) and axes 222 of a modeling coordinate system 224. The x-y planes of the capture coordinate system and the modeling coordinate system 224 are parallel to a ground plane, and the z-axes of the capture coordinate system and the modeling coordinate system 224 are coming out of the page. The images and associated poses of the environment 200 may be associated with the capture coordinate system. The capture coordinate system may be generated at a beginning of a capture, for example based on one or more images captured at the beginning of the capture. An origin and the axes 212 of the capture coordinate system may be generated at the beginning of the capture, for example based on one or more poses associated with the one or more images captured at the beginning of the capture. The modeling coordinate system 224 may be generated by adjusting the capture coordinate system according to the environment 200, or objects therein. In other words, the modeling coordinate system 224 may be based on geometries defined by an environment coordinate system. The modeling coordinate system 224 may be generated based on two or more images of the capture. The modeling coordinate system 224 may be generated after a capture.

A 3d model of the environment 200 is generated in the modeling coordinate system 224. The environment 200, or objects therein (e.g., the loveseat 202, the end table 204, the sofa 206, the lounge chair 208, or the coffee table 210), may have been observed according to the capture coordinate system, but exist in a real-world that is not subjective to the capture device, nor the capture coordinate system. Generating a 3d model including 3d representations (e.g., 3d objects, 3d primitives, etc.) of the environment 200, or objects therein, based on the modeling coordinate system

224 may not impute any inconsistencies between the capture coordinate system (i.e., the observed coordinate system) and an actual coordinate system for the environment (i.e., an environment coordinate system), and may include consistencies between the modeling coordinate system 224 and the actual coordinate system for the environment. In other words, generating a 3d model including 3d representation that do not conform the capture device but instead conform to the environment 200, or objects therein, is achieved by generating and using the modeling coordinate system 224 by adjusting the capture coordinate system according to the environment 200, or objects therein, in two or more images of the capture. When generating the 3d model of the environment 200 in the modeling coordinate system 224, the consistencies between the modeling coordinate system 224 and the actual coordinate system for the environment 200 (i.e., the environment coordinate system) may manifest as alignments between the modeling coordinate system 224 and 3d representations (e.g., 3d objects, 3d primitives, etc.) of the 3d model. The alignments between the modeling coordinate system 224 and the 3d representations of the 3d model may be because the modeling coordinate system 224 is based on the environment 200, or objects therein.

Disclosed herein are methods, storage media, and systems for generating 3d coordinate systems, such as the modeling coordinate system. In some embodiments, the modeling coordinate system may be generated based on one or more points or one or more line segments in one or more images and poses associated with the one or more images, where the one or more images and the poses are associated with the capture coordinate system. In some embodiments, the modeling coordinate system may be generated based on 2d geometry in one or more images and poses associated with the one or more images, where the one or more images and the poses are associated with the capture coordinate system. In some embodiments, the modeling coordinate system may be generated based on 3d content associated with one or more images and poses associated with the one or more images, where the one or more images and poses are associated with the capture coordinate system. In some embodiments, the modeling coordinate system may be a modified (e.g., rotated, translated, or both) version of the capture coordinate system. In some embodiments, poses in the capture coordinate system may be modified (e.g., rotated, translated, or both) and the modified poses may be poses of the modeling coordinate system.

Figure 3:
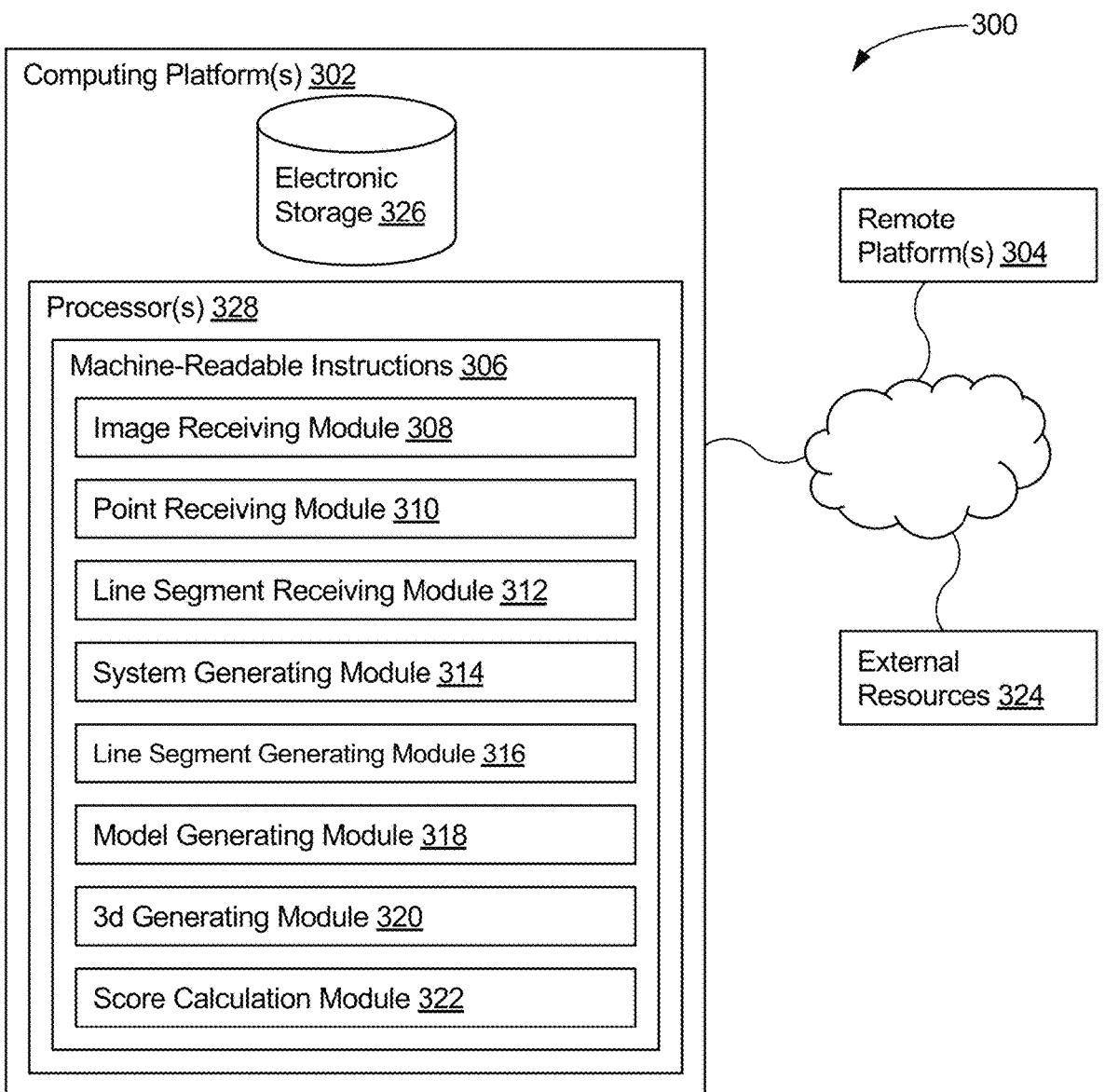
FIG. 3 illustrates a system configured generating a three-dimensional coordinate system, according to some embodiments.

FIG. 3 illustrates a system 300 configured generating a three-dimensional coordinate system, in accordance with one or more embodiments. In some embodiments, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of image receiving module 308, point receiving module 310, line segment receiving module 312, system generating module 314 (e.g., 3d coordinate system generating module 314), line segment generating module 316 (e.g., 3d line segment generating module 316), model generating module 318 (e.g., 3d model generating module 318), 3d generating module 320 (e.g., 3d coordinate system generating module 320), score calculation module 322, and/or other instruction modules.

Image receiving module 308 may be configured to receive a first image and an associated first camera pose including a first camera location and a first camera orientation. The first 2d line segment may correspond to a real-world object depicted in the first image. The first 2d line segment may correspond to an attribute of the first image. The first 2d line segment may be horizontal relative to a ground plane based on the first image. Generating the first 3d coordinate system may include defining a first ground plane based on the first image.

Generating the first 3d coordinate system may include projecting the first camera location onto the first ground plane.

Image receiving module 308 may be configured to receive a second image and an associated second camera pose including a second camera location and a second camera orientation. Generating the first 3d coordinate system may include projecting the second camera location onto the first ground plane.

Image receiving module 308 may be configured to receive a third image and an associated third camera pose including a third camera location and a third camera orientation. Generating the second 3d coordinate system may include projecting the third camera location onto the second ground plane.

Image receiving module 308 may be configured to receive a fourth image and an associated fourth camera pose including a fourth camera location and a fourth camera orientation. Generating the second 3d coordinate system may include projecting the fourth camera location onto the second ground plane.

Point receiving/detecting module 310 may be configured to receive/detect a first point in the first image. Generating the first 3d coordinate system may include projecting the first point onto the first ground plane. Generating the first 3d coordinate system may further include projecting the origin of the first 3d coordinate system orthogonally relative to the first ground plane based on the first point. Generating the first 3d coordinate system may further include rotating axes of the first 3d coordinate system based on the first 2d line segment. Rotating the axes of the first 3d coordinate system may be further based on a slope of the first 2d line segment.

Rotating the axes of the first 3d coordinate system may include aligning an axis of the axes of the first 3d coordinate system with the first 2d line segment. The aligned axis of the axes of the first 3d coordinate system may be parallel with the first 2d line segment. Rotating the axes of the first 3d coordinate system may be further based on a gravity vector associated with the first image.

Point receiving module 310 may be configured to receive/detect a second point in the second image. Generating the first 3d coordinate system may include projecting the second point onto the first ground plane. The second point may correspond to the first point.

Point receiving module 310 may be configured to receive/detect a third point in the third image. Generating the second 3d coordinate system may include projecting the third point onto the second ground plane. The third point may correspond to the first point.

Point receiving module 310 may be configured to receive/detect a fourth point in the fourth image. Generating the second 3d coordinate system may include projecting the fourth point onto the second ground plane. The fourth point may correspond to the first point.

Line segment receiving module 312 may be configured to receive/detect a first two-dimensional (2d) line segment in the first image. A first end point of the first 2d line segment may be the first point.

Line segment receiving module 312 may be configured to receive/detect a second 2d line segment in the third image. A first end point of the second 2d line segment may be the third point.

System generating module 314 may be configured to generate a first three-dimensional (3d) coordinate system based on the first camera pose, the second camera pose, the first point, the second point, and the first 2d line segment.

Line segment generating module 316 may be configured to generate a 3d line segment based on the first 3d coordinate system and the first 2d line segment.

Model generating module 318 may be configured to generate a 3d model with reference to the first 3d coordinate system. Generating the 3d model may be based on a plurality of images including the first image and the second image. The 3d model may include the 3d line segment.

3d generating module 320 may be configured to generate a second 3d coordinate system based on the third camera pose. Generating the second 3d coordinate system may include defining a second ground plane based on the third image. Generating the second 3d coordinate system may include calculating an origin of the second 3d coordinate system based on an intersection of a third line connecting the projected third camera location and the projected third point and a fourth line connecting the projected fourth camera location and the projected fourth point. Generating the second 3d coordinate system may further include projecting the origin of the second 3d coordinate system orthogonally relative to the second ground plane based on the third point. Generating the second 3d coordinate system may further include rotating axes of the second 3d coordinate system based on the second 2d line segment.

Rotating the axes of the second 3d coordinate system may include aligning an axis of the axes of the second 3d coordinate system with the second 2d line segment. The aligned axis of the axes of the second 3d coordinate system may be parallel with the second 2d line segment. By way of non-limiting example, the fourth camera pose, the third point, the fourth point, and the second line segment.

Score calculation module 322 may be configured to calculate a score based on the alignment of the axis of the axes of the first 3d coordinate system with the first 2d line segment and the alignment of the axis of the axes of the second 3d coordinate system with the second 2d line segment. The score may quantify a variation between the alignment of the axis of the axes of the first 3d coordinate system with the first 2d line segment and the alignment of the axis of the axes of the second 3d coordinate system with the second 2d line segment.

In some embodiments, generating the first 3d coordinate system may include calculating an origin of the first 3d coordinate system based on an intersection of a first line connecting the projected first camera location and the projected first point and a second line connecting the projected second camera location and the projected second point.

In some embodiments, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some embodiments, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some embodiments, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software; hardware; firmware; some combination of software, hardware, and/or firmware; and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in embodiments in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

Figure 4:
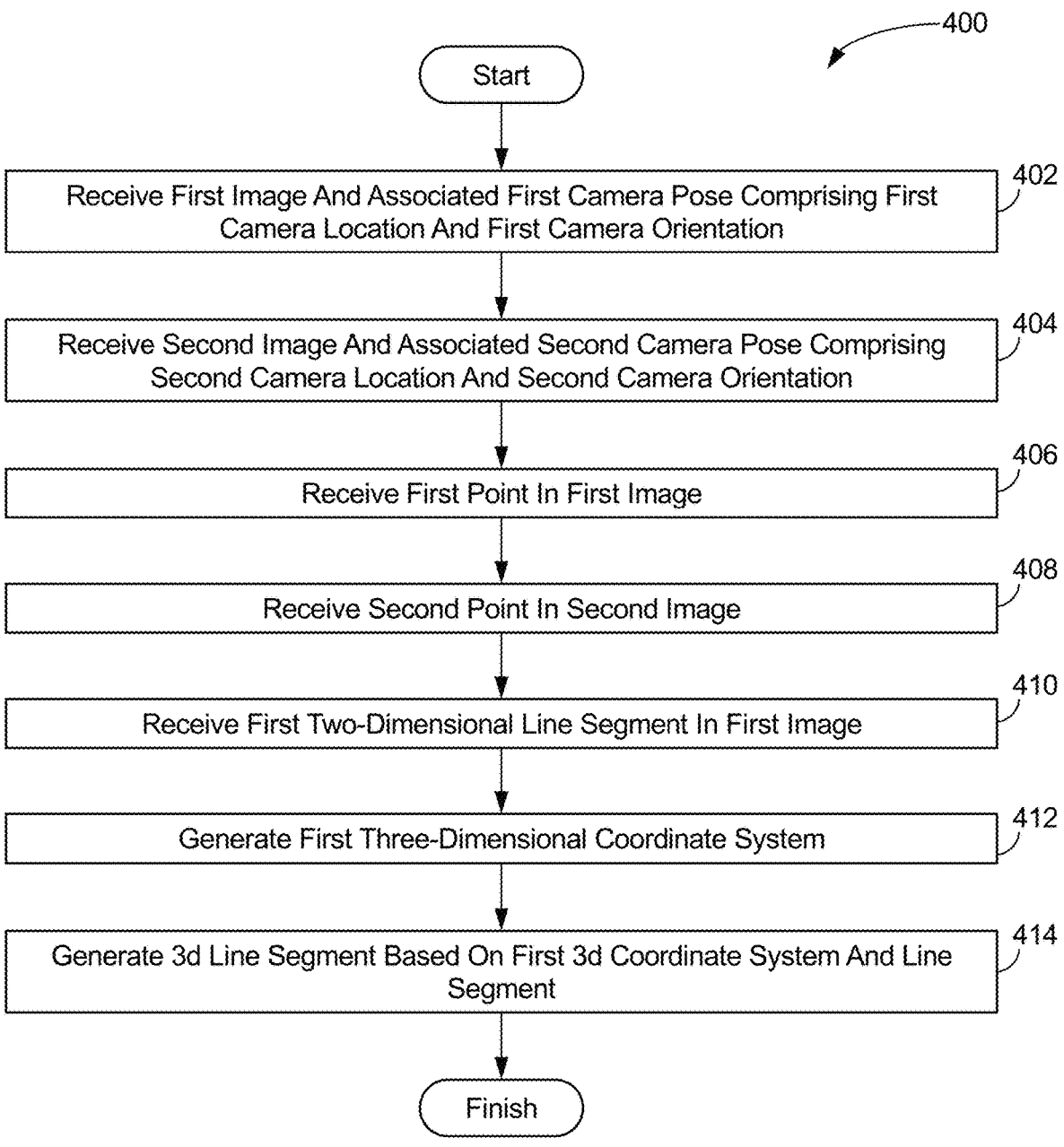
FIG. 4 illustrates a method generating a three-dimensional coordinate system, according to some embodiments.

FIG. 4 illustrates a method 400 generating a three-dimensional coordinate system, in accordance with one or more embodiments. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Figure 5:
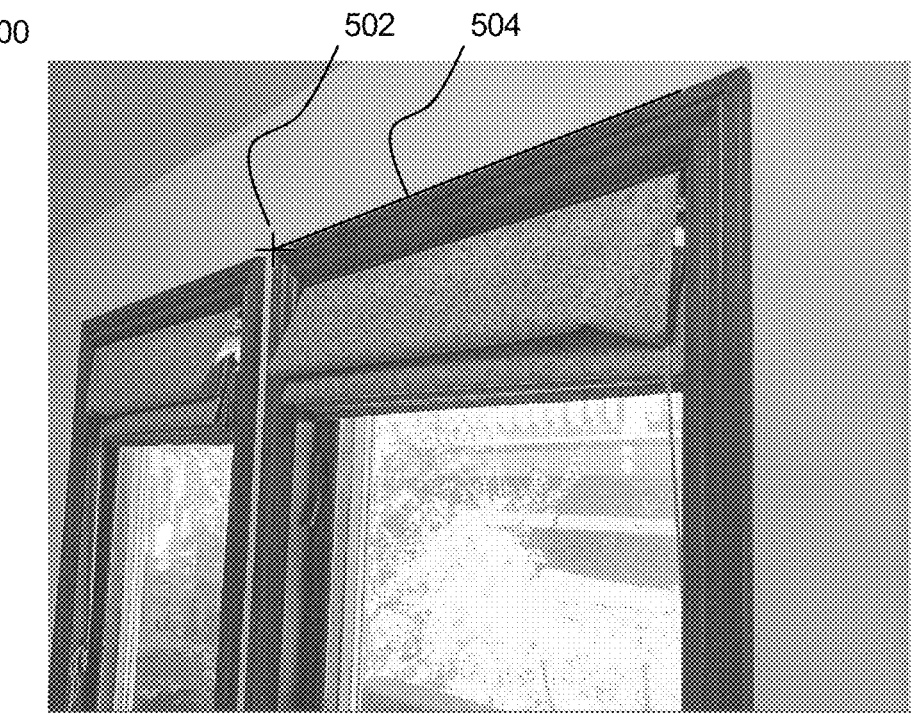
FIG. 5 illustrates a first image of an environment, according to some embodiments.

An operation 402 may include receiving a first image and an associated first camera pose including a first camera location and a first camera orientation. The first image and the first camera pose may be associated with a capture coordinate system. Operation 402 may be performed by one or more hardware processors configured by machine-readable instructions including a module that is the same as or similar to image receiving module 308, in accordance with one or more embodiments. Referring briefly to FIG. 5, it illustrates a first image 500 of an environment, according to some embodiments.

Figure 6:
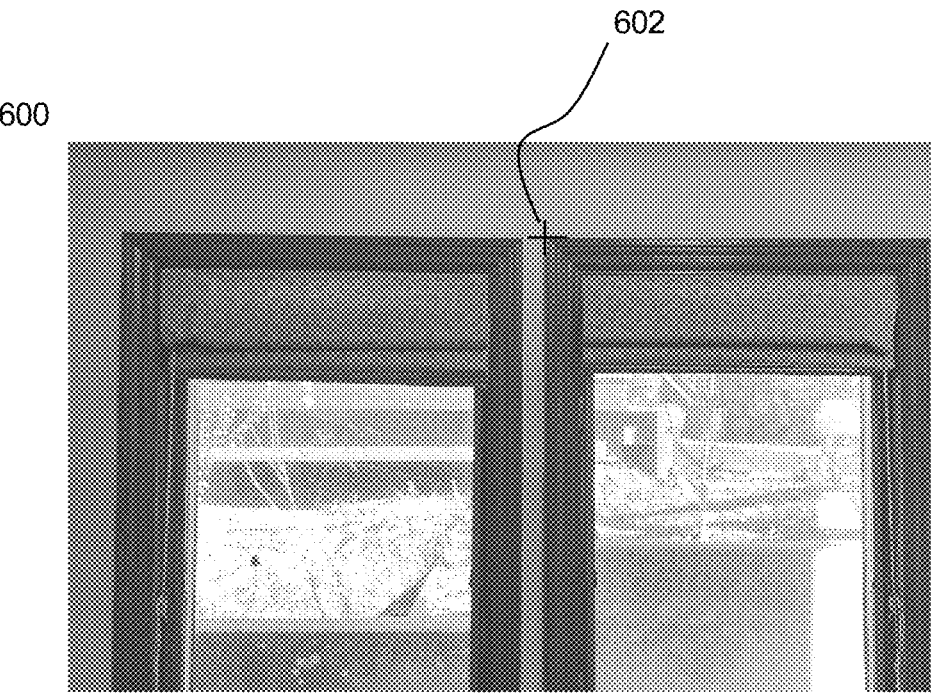
FIG. 6 illustrates a second image of an environment, according to some embodiments.

An operation 404 may include receiving a second image and an associated second camera pose including a second camera location and a second camera orientation. The second image and the second camera pose may be associated with the capture coordinate system. Operation 404 may be performed by one or more hardware processors configured by machine-readable instructions including a module that is the same as or similar to image receiving module 308, in accordance with one or more embodiments. Referring briefly to FIG. 6, it illustrates a second image 600 of the environment, according to some embodiments. In some embodiments, the first image and the second image are at least a threshold angular distance from one another.

An operation 406 may include receiving/detecting a first point in the first image. Operation 406 may be performed by one or more hardware processors configured by machine-readable instructions including a module that is the same as or similar to point receiving module 310, in accordance with one or more embodiments. Referring briefly to FIG. 5, it illustrates a first point 502 in the first image 500. The first point 502 corresponds to the top-left corner of the right window of the environment.

An operation 408 may include receiving/detecting a second point in the second image. The second point may correspond to the first point in the first image. Operation 408 may be performed by one or more hardware processors configured by machine-readable instructions including a module that is the same as or similar to point receiving module 310, in accordance with one or more embodiments. Referring briefly to FIG. 6, it illustrates a second point 602 in the second image 600. The second point 602 corresponds to the top-left corner of the right window of the environment. The second point 602 corresponds to the first point 502.

An operation 410 may include receiving/detecting a first two-dimensional (2d) line segment in the first image. A first end point of the first 2d line segment may be the first point. The first 2d line segment may be colinear with the first point. Operation 410 may be performed by one or more hardware processors configured by machine-readable instructions including a module that is the same as or similar to line segment receiving module 312, in accordance with one or more embodiments. Referring briefly to FIG. 5, it illustrates a first 2d line segment 504. A first end of the first 2d line segment 504 corresponds to the first point 502.

In some embodiments, the first 2d line segment corresponds to a real-world object depicted in the first image. In some embodiments, the first 2d line segment corresponds to an attribute of the first image. In some embodiments, the first 2d line segment is horizontal relative to a ground plane based on the first image.

An operation 412 may include generating a first three-dimensional (3d) coordinate system based on the first camera pose, the second camera pose, the first point, the second point, and the first 2d line segment. Operation 412 may be performed by one or more hardware processors configured by machine-readable instructions including a module that is the same as or similar to system generating module 314, in accordance with one or more embodiments.

Figure 7:
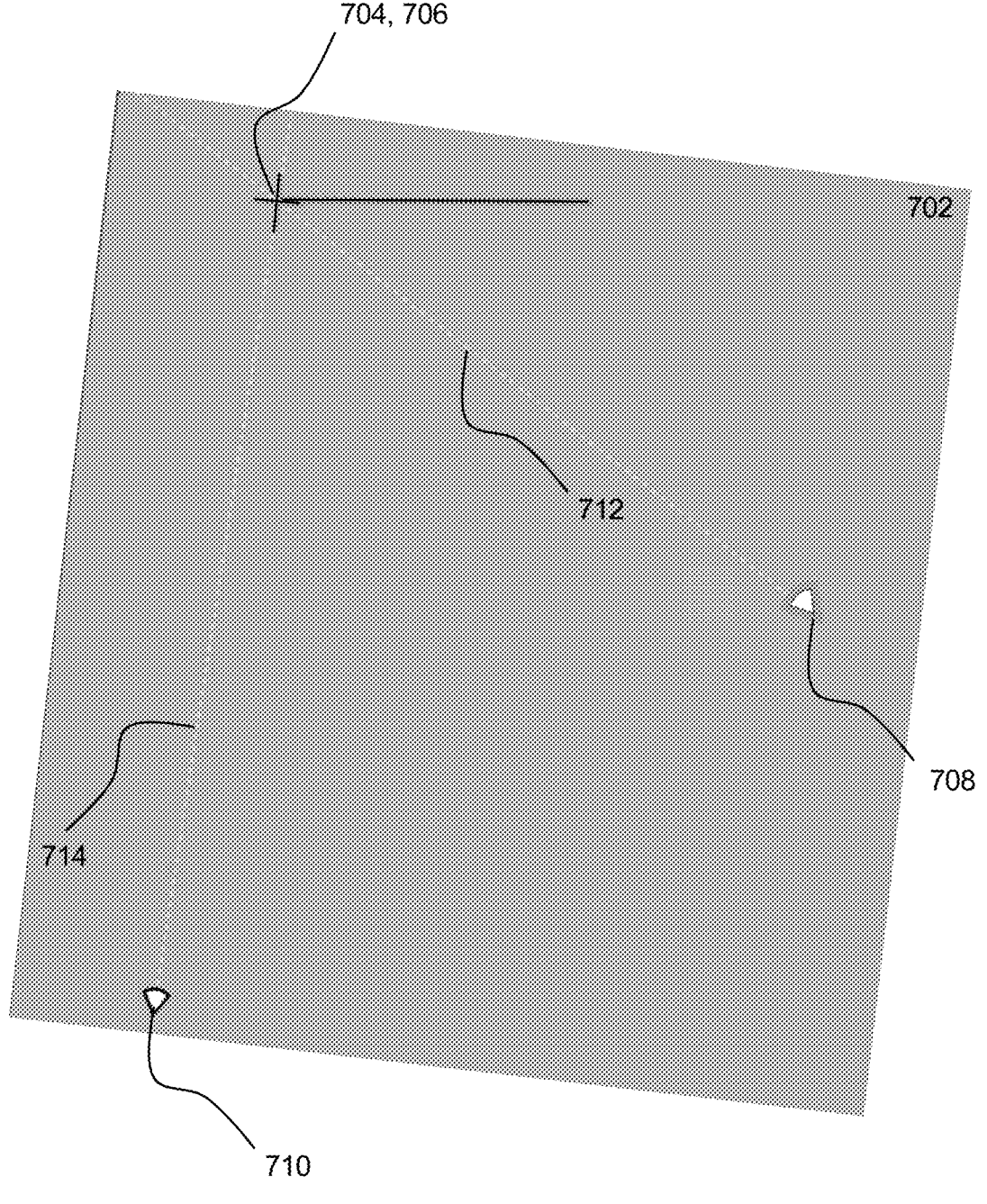
FIG. 7 illustrates a ground plane, according to some embodiments.

In some embodiments, generating the first 3d coordinate system includes: defining a first ground plane based on the first image, projecting the first point onto the first ground plane, projecting the second point onto the first ground plane, projecting the first camera location onto the first ground plane, projecting the second camera location onto the first ground plane; and calculating an origin of the first 3d coordinate system based on an intersection of a first line connecting the projected first camera location and the projected first point and a second line connecting the projected second camera location and the projected second point. Referring briefly to FIG. 7, it illustrates ground plane 702, according to some embodiments. FIG. 7 illustrates a first ground plane 702, a projected first point 704, a projected second point 706, a projected first camera location 708, a projected second camera location 710, a first line 712 connecting the projected first camera location 708 and the projected first point 704, and a second line 714 connecting the projected second camera location 710 and the projected second point 706. An origin of a first 3d coordinate system is based on the intersection of the first line 712 and the second line 714.

In some embodiments, generating the first 3d coordinate system further includes projecting the origin of the first 3d coordinate system orthogonally relative to the first ground plane based on the first point.

In some embodiments, generating the first 3d coordinate system further includes rotating axes of the first 3d coordinate system based on the first 2d line segment. In some embodiments, rotating the axes of the first 3d coordinate system is further based on a slope of the first 2d line segment. In some embodiments, rotating the axes of the first 3d coordinate system includes aligning an axis of the axes of the first 3d coordinate system with the first 2d line segment. In some embodiments, the aligned axis of the axes of the first 3d coordinate system is parallel with the first 2d line segment. In some embodiments, rotating the axes of the first 3d coordinate system is further based on a gravity vector associated with the first image.

An operation 414 may include generating a 3d line segment based on the first 3d coordinate system and the first 2d line segment. Operation 414 may be performed by one or more hardware processors configured by machine-readable instructions including a module that is the same as or similar to line segment generating module 316, in accordance with one or more embodiments.

In some embodiments, method 400 includes generating a 3d model with reference to the 3d coordinate system. In some embodiments, generating the 3d model is based on one or more images including the first image and the second image. In some embodiments, the 3d model includes the 3d line segment.

In some embodiments, method 400 includes receiving a third image and an associated third camera pose including a third camera location and a third camera orientation (similar to operation 402), receiving a fourth image and an associated fourth camera pose including a fourth camera location and a fourth camera orientation (similar to operation 404), receiving a third point in the third image, wherein the third point corresponds to the first point (similar to operation 406), receiving a fourth point in the fourth image, wherein the fourth point corresponds to the first point (similar to operation 408), receiving a second 2d line segment in the third image, wherein a first end point of the second 2d line segment is the third point (similar to operation 410), and generating a second 3d coordinate system based on the third camera pose, the fourth camera pose, the third point, the fourth point (similar to operation 412), and the second 2d line segment (similar to operation 414). The third image and the third camera pose may be associated with the capture coordinate system. The fourth image and the fourth camera pose may be associated with the capture coordinate system. The second 2d line segment may be colinear with the third point.

In some embodiments, generating the second 3d coordinate system includes: defining a second ground plane based on the third image, projecting the third point onto the second ground plane, projecting the fourth point onto the second ground plane, projecting the third camera location onto the second ground plane, projecting the fourth camera location onto the second ground plane, and calculating an origin of the second 3d coordinate system based on an intersection of a third line connecting the projected third camera location and the projected third point and a fourth line connecting the projected fourth camera location and the projected fourth point.

In some embodiments, generating the second 3d coordinate system further includes projecting the origin of the second 3d coordinate system orthogonally relative to the second ground plane based on the third point.

In some embodiments, generating the second 3d coordinate system further includes rotating axes of the second 3d coordinate system based on the second 2d line segment. In some embodiments, rotating the axes of the second 3d coordinate system comprises aligning an axis of the axes of the second 3d coordinate system with the second 2d line segment. In some embodiments, the aligned axis of the axes of the second 3d coordinate system is parallel with the second 2d line segment.

In some embodiments, method 400 includes calculating a score based on the alignment of the axis of the axes of the first 3d coordinate system with the first 2d line segment and the alignment of the axis of the axes of the second 3d coordinate system with the second 2d line segment. In some embodiments, the score quantifies a variation between the alignment of the axis of the axes of the first 3d coordinate system with the first 2d line segment and the alignment of the axis of the axes of the second 3d coordinate system with the second 2d line segment.

Figure 8:
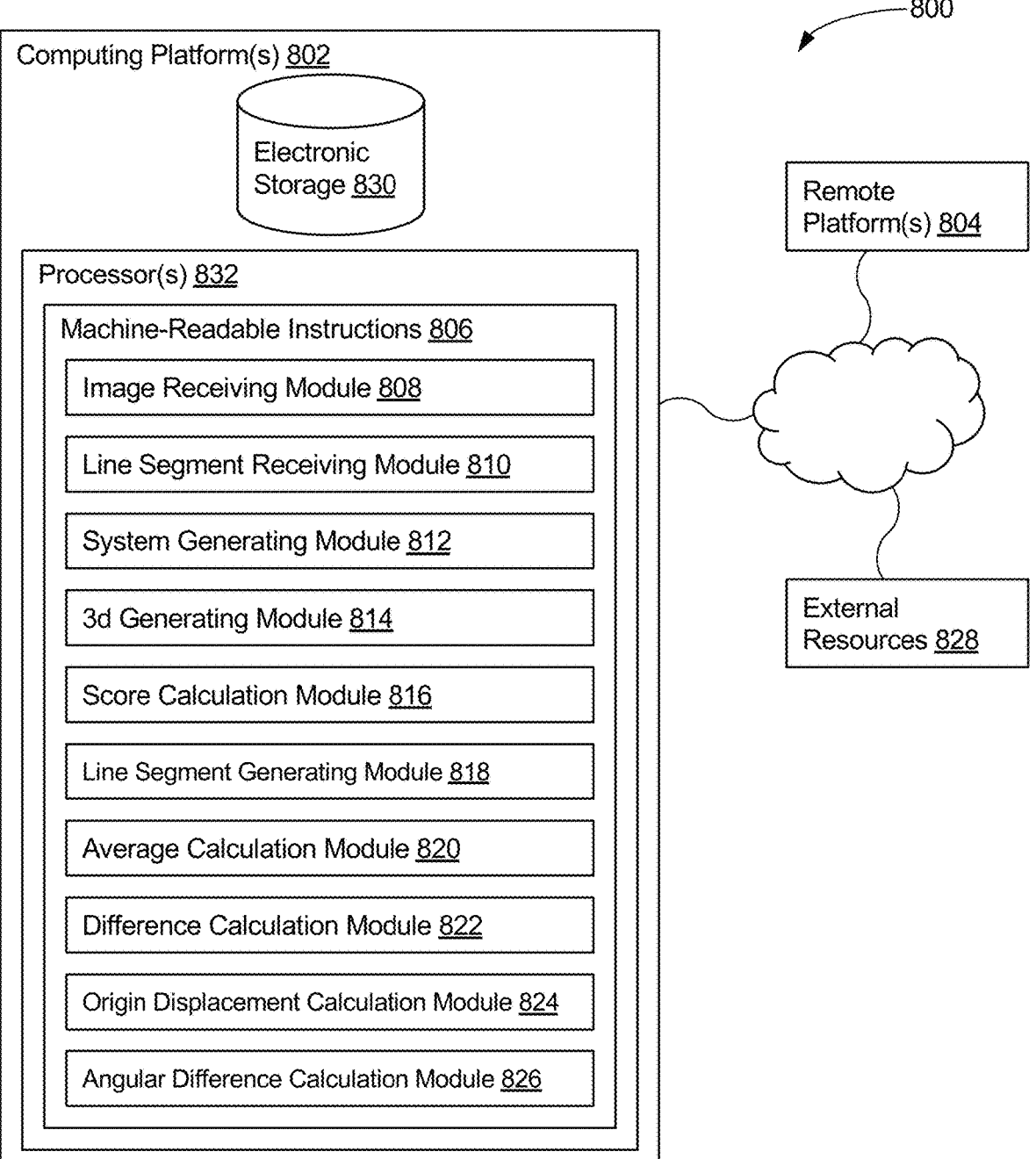
FIG. 8 illustrates a system configured for evaluating quality of camera poses associated with images, according to some embodiments.

FIG. 8 illustrates a system 800 configured for evaluating quality of camera poses associated with images, in accordance with one or more embodiments. In some embodiments, system 800 may include one or more computing platforms 802. Computing platform(s) 802 may be configured to communicate with one or more remote platforms 804 according to a client/server architecture, a peer-to-peer architecture, and/or other architectures. Remote platform(s) 804 may be configured to communicate with other remote platforms via computing platform(s) 802 and/or according to a client/server architecture, a peer-to-peer architecture, and/or other architectures. Users may access system 800 via remote platform(s) 804.

Computing platform(s) 802 may be configured by machine-readable instructions 806. Machine-readable instructions 806 may include one or more instruction modules. The instruction modules may include computer program modules. The instruction modules may include one or more of image receiving module 808, line segment receiving module 810, system generating module 812 (e.g., 3d coordinate system generating module 812), 3d generating module 814 (e.g., 3d coordinate system generating module 814), score calculation module 816, line segment generating module 818, average calculation module 820, difference calculation module 822, origin displacement calculation module 824, angular difference calculation module 826, and/or other instruction modules.

Image receiving module 808 may be configured to receive a first image and an associated first camera pose including a first camera location and a first camera orientation. The first 2d line segment may correspond to a real-world object depicted in the first image. The first 2d line segment may correspond to an attribute of the first image. The first 2d line segment may be horizontal relative to a first ground plane based on the first image. Generating the first 3d coordinate system may include defining a first ground plane based on the first image.

Generating the first 3d coordinate system may include projecting the first camera location onto the first ground plane.

Image receiving module 808 may be configured to receive a second image and an associated second camera pose including a second camera location and a second camera orientation. Generating the first 3d coordinate system may include projecting the second camera location onto the first ground plane.

Line segment receiving module 810 may be configured to receive/detect a first two-dimensional (2d) line segment in the first image. The first 2d line segment may include a first end point and a second end point. Generating the first 3d coordinate system may include projecting the first end point onto the first ground plane. Generating the first 3d coordinate system may further include projecting the first origin of the first 3d coordinate system orthogonally relative to the first ground plane based on the first end point. Generating the first 3d coordinate system may further include rotating axes of the first 3d coordinate system based on the first 2d line segment.

Rotating the axes of the first 3d coordinate system may be further based on a slope of the first 2d line segment. Rotating the axes of the second 3d coordinate system may be further based on a slope of the second 2d line segment. Rotating the axes of the first 3d coordinate system may include aligning an axis of the axes of the first 3d coordinate system with the first 2d line segment. Rotating the axes of the second 3d coordinate system may include aligning an axis of the axes of the second 3d coordinate system with the second 2d line segment. Rotating the axes of the first 3d coordinate system may be further based on a gravity vector associated with the first image. Rotating the axes of the second 3d coordinate system may be further based on a gravity vector associated with the second image.

Line segment receiving module 810 may be configured to receive/detect a second 2d line segment in the second image. The second 2d line segment may correspond to the real-world object depicted in the second image. The second 2d line segment may correspond to the attribute of the second image. The second 2d line segment may be horizontal relative to a second ground plane based on the second image. The second 2d line segment may include a third end point and a fourth end point.

The first end point may correspond to the third end point and the second end point corresponds to the fourth end point. Generating the first 3d coordinate system may include projecting the third end point onto the first ground plane.

System generating module 812 may be configured to generate a first three-dimensional (3d) coordinate system based on the first camera pose, the second camera pose, the first 2d line segment, and the second 2d line segment.

3d generating module 814 may be configured to generate a second 3d coordinate system based on the first camera pose, the second pose, the first 2d line segment, and the second 2d line segment. Generating the second 3d coordinate system may include defining a second ground plane based on the second image. Generating the second 3d coordinate system may include projecting the second end point onto the second ground plane. Generating the second 3d coordinate system may include projecting the fourth end point onto the second ground plane. Generating the second 3d coordinate system may include projecting the first camera location onto the second ground plane.

Generating the second 3d coordinate system may include projecting the second camera location onto the second ground plane. Generating the second 3d coordinate system may include calculating a second origin of the second 3d coordinate system based on an intersection of a third line connecting the projected first camera location and the projected second end point and a fourth line connecting the projected second camera location and the projected fourth end point. Generating the second 3d coordinate system may further include projecting the second origin of the second 3d coordinate system orthogonally relative to the second ground plane based on the fourth end point. Generating the second 3d coordinate system may further include rotating axes of the second 3d coordinate system based on the second 2d line segment.

Score calculation module 816 may be configured to calculate a score based on the first 3d coordinate system and the second 3d coordinate system.

Line segment generating module 818 may be configured to generate a third line segment. The third line segment may include a fifth end point and a sixth end point. The fifth end point may correspond to the projected first origin of the first 3d coordinate system. The sixth end point may correspond to a projection of the second end point onto a horizontal vector of an axis of the axes of the first 3d coordinate system.

Line segment generating module 818 may be configured to generate a fourth line segment. The fourth line segment may include a seventh end point and an eighth end point. The seventh end point may correspond to the projected second origin of the second 3d coordinate system. The eighth end point may correspond to a projection of the third end point onto a horizontal vector of an axis of the axes of the second 3d coordinate system.

Average calculation module 820 may be configured to calculate an average of a length of the third line segment and a length of the fourth line segment. Calculating the score may be further based on the average.

Difference calculation module 822 may be configured to calculate a difference between a length of the third line segment and a length of the fourth line segment. Calculating the score may be further based on the difference.

Origin displacement calculation module 824 may be configured to calculate an origin displacement based on a linear distance between the projected first origin of the first 3d coordinate system and the projected second origin of the second 3d coordinate system. Calculating the score may be further based on the origin displacement.

Angular difference calculation module 826 may be configured to calculate a first angular difference between the first camera location and the second camera location based on the projected first origin of the first 3d coordinate system. Calculating the score may be further based on the first angular difference.

Angular difference calculation module 826 may be configured to calculate a second angular difference between the first camera location and the second camera location based on the projected second origin of the second 3d coordinate system. Calculating the score may be further based on the second angular difference.

Angular difference calculation module 826 may be configured to calculate a third angular difference between a first vector and the first 2d line segment. Calculating the score may be further based on the third angular difference. The first vector may be defined by the first camera location and the aligned axis of the axes of the first 3d coordinate system. The aligned axis of the axes of the first 3d coordinate system may be parallel with the first 2d line segment.

Angular difference calculation module 826 may be configured to calculate a fourth angular difference between a second vector and the second 2d line segment. Calculating the score may be further based on the fourth angular difference. The second vector may be defined by the second camera location and the aligned axis of the axes of the second 3d coordinate system. The aligned axis of the axes of the second 3d coordinate system may be parallel with the second 2d line segment.

In some embodiments, generating the first 3d coordinate system may include calculating a first origin of the first 3d coordinate system based on an intersection of a first line connecting the projected first camera location and the projected first end point and a second line connecting the projected second camera location and the projected third end point.

In some embodiments, computing platform(s) 802, remote platform(s) 804, and/or external resources 828 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which computing platform(s) 802, remote platform(s) 804, and/or external resources 828 may be operatively linked via some other communication media.

A given remote platform 804 may include one or more processors configured to execute computer program modules. The computer program modules may be configured to enable an expert or user associated with the given remote platform 804 to interface with system 800 and/or external resources 828, and/or provide other functionality attributed herein to remote platform(s) 804. By way of non-limiting example, a given remote platform 804 and/or a given computing platform 802 may include one or more of a server, a desktop computer, a laptop computer, a handheld computer, a tablet computing platform, a NetBook, a Smartphone, a gaming console, and/or other computing platforms.

External resources 828 may include sources of information outside of system 800, external entities participating with system 800, and/or other resources. In some embodiments, some or all of the functionality attributed herein to external resources 828 may be provided by resources included in system 800.

Computing platform(s) 802 may include electronic storage 830, one or more processors 832, and/or other components. Computing platform(s) 802 may include communication lines, or ports to enable the exchange of information with a network and/or other computing platforms. Illustration of computing platform(s) 802 in FIG. 8 is not intended to be limiting. Computing platform(s) 802 may include a plurality of hardware, software, and/or firmware components operating together to provide the functionality attributed herein to computing platform(s) 802. For example, computing platform(s) 802 may be implemented by a cloud of computing platforms operating together as computing platform(s) 802.

Electronic storage 830 may comprise non-transitory storage media that electronically stores information. The electronic storage media of electronic storage 830 may include one or both of system storage that is provided integrally (i.e., substantially non-removable) with computing platform(s) 802 and/or removable storage that is removably connectable to computing platform(s) 802 via, for example, a port (e.g., a USB port, a firewire port, etc.) or a drive (e.g., a disk drive, etc.). Electronic storage 830 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 830 may include one or more virtual storage resources (e.g., cloud storage, a virtual private network, and/or other virtual storage resources). Electronic storage 830 may store software algorithms, information determined by processor(s) 832, information received from computing platform(s) 802, information received from remote platform(s) 804, and/or other information that enables computing platform(s) 802 to function as described herein.

Processor(s) 832 may be configured to provide information processing capabilities in computing platform(s) 802. As such, processor(s) 832 may include one or more of a digital processor, an analog processor, a digital circuit designed to process information, an analog circuit designed to process information, a state machine, and/or other mechanisms for electronically processing information. Although processor(s) 832 is shown in FIG. 8 as a single entity, this is for illustrative purposes only. In some embodiments, processor(s) 832 may include a plurality of processing units. These processing units may be physically located within the same device, or processor(s) 832 may represent processing functionality of a plurality of devices operating in coordination. Processor(s) 832 may be configured to execute modules 808, 810, 812, 814, 816, 818, 820, 822, 824, and/or 826, and/or other modules. Processor(s) 832 may be configured to execute modules 808, 810, 812, 814, 816, 818, 820, 822, 824, and/or 826, and/or other modules by software; hardware; firmware; some combination of software, hardware, and/or firmware; and/or other mechanisms for configuring processing capabilities on processor(s) 832. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 808, 810, 812, 814, 816, 818, 820, 822, 824, and/or 826 are illustrated in FIG. 8 as being implemented within a single processing unit, in embodiments in which processor(s) 832 includes multiple processing units, one or more of modules 808, 810, 812, 814, 816, 818, 820, 822, 824, and/or 826 may be implemented remotely from the other modules. The description of the functionality provided by the different modules 808, 810, 812, 814, 816, 818, 820, 822, 824, and/or 826 described below is for illustrative purposes, and is not intended to be limiting, as any of modules 808, 810, 812, 814, 816, 818, 820, 822, 824, and/or 826 may provide more or less functionality than is described. For example, one or more of modules 808, 810, 812, 814, 816, 818, 820, 822,

824, and/or 826 may be eliminated, and some or all of its functionality may be provided by other ones of modules 808, 810, 812, 814, 816, 818, 820, 822, 824, and/or 826. As another example, processor(s) 832 may be configured to execute one or more additional modules that may perform some or all of the functionality attributed below to one of modules 808, 810, 812, 814, 816, 818, 820, 822, 824, and/or 826.

Figure 9:
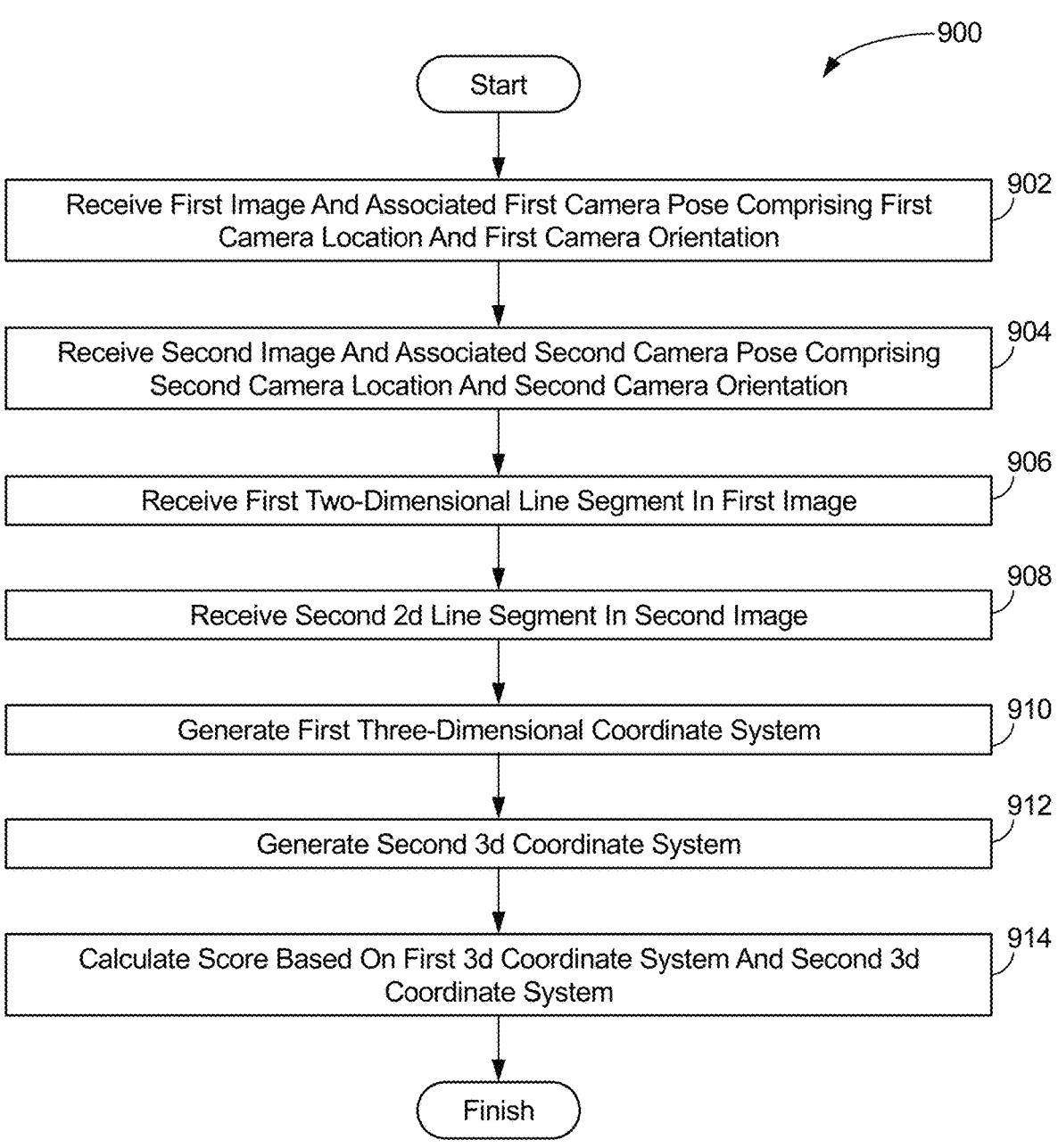
FIG. 9 illustrates a method for evaluating quality of camera poses associated with images, according to some embodiments.

FIG. 9 illustrates a method 900 for evaluating quality of camera poses associated with images, in accordance with one or more embodiments. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

Figure 10:
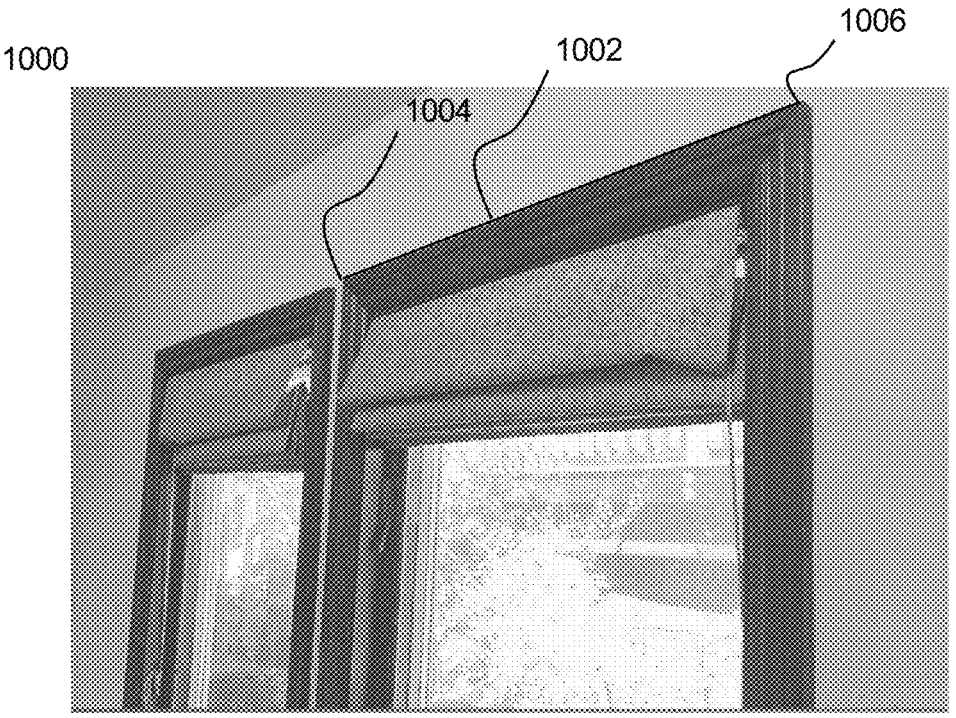
FIG. 10 illustrates a first image of an environment, according to some embodiments.

An operation 902 may include receiving a first image and an associated first camera pose including a first camera location and a first camera orientation. The first image and the first camera pose may be associated with a capture coordinate system. Operation 902 may be performed by one or more hardware processors configured by machine-readable instructions including a module that is the same as or similar to image receiving module 808, in accordance with one or more embodiments. Referring briefly to FIG. 10, it illustrates a first image 1000 of an environment, according to some embodiments.

Figure 11:
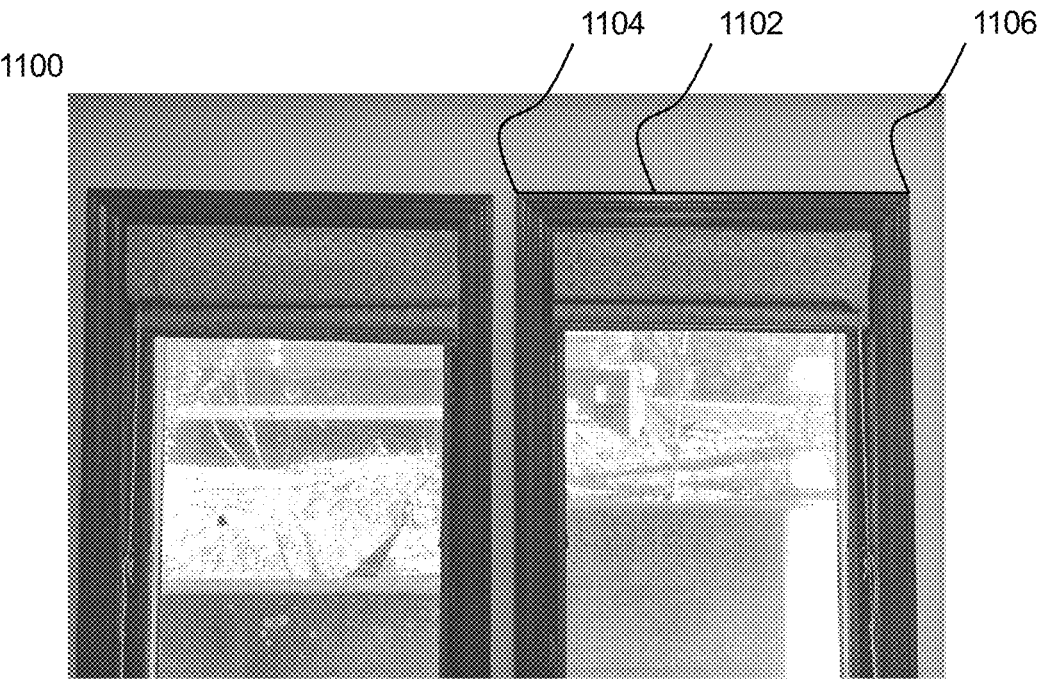
FIG. 11 illustrates a second image of an environment, according to some embodiments.

An operation 904 may include receiving a second image and an associated second camera pose including a second camera location and a second camera orientation. The second image and the second camera pose may be associated with the capture coordinate system. Operation 904 may be performed by one or more hardware processors configured by machine-readable instructions including a module that is the same as or similar to image receiving module 808, in accordance with one or more embodiments. Referring briefly to FIG. 11, it illustrates a second image 1100 of the environment, according to some embodiments. In some embodiments, the first image and the second image are at least a threshold angular distance from one another.

An operation 906 may include receiving/detecting a first two-dimensional (2d) line segment in the first image. The first 2d line segment may include a first end point and a second end point. The first end point may be colinear with the second end point. Operation 906 may be performed by one or more hardware processors configured by machine-readable instructions including a module that is the same as or similar to line segment receiving module 810, in accordance with one or more embodiments. Referring briefly to FIG. 10, it illustrates first 2d line segment 1002 in the first image 1000. The first 2d line segment 1002 includes a first end point 1004 and a second end point 1006. The first end point 1004 corresponds to the top-left corner of the right window in the environment and the second end point 1006 corresponds to the top-right corner of the right window of the environment.

An operation 908 may include receiving/detecting a second 2d line segment in the second image. The second 2d line segment may include a third end point and a fourth end point. The third end point may be colinear with the fourth end point. The first end point may correspond to the third end point and the second end point may correspond to the fourth end point. Operation 908 may be performed by one or more hardware processors configured by machine-readable instructions including a module that is the same as or similar to line segment receiving module 810, in accordance with one or more embodiments. Referring briefly to FIG. 11, it illustrates a second 2d line segment 1102 in the second image 1100. The second 2d line segment 1102 includes a third end point 1104 and a fourth end point 1106. The third end point 1104 corresponds to the top-left corner of the right window in the environment and the fourth end point 1106 corresponds to the top-right corner of the right window of the environment. The first end point 1004 corresponds to the third end point 1104 and the second end point 1006 corresponds to the fourth end point 1106.

In some embodiments, the first 2d line segment corresponds to a real-world object depicted in the first image and the second 2d line segment corresponds to the real-world object depicted in the second image. In some embodiments, the first 2d line segment corresponds to an attribute of the first image and the second 2d line segment corresponds to the attribute of the second image. In some embodiments, the first 2d line segment is horizontal relative to a first ground plane based on the first image and the second 2d line segment is horizontal relative to a second ground plane based on the second image.

An operation 910 may include generating a first three-dimensional (3d) coordinate system based on the first camera pose, the second camera pose, the first 2d line segment, and the second 2d line segment. Operation 910 may be performed by one or more hardware processors configured by machine-readable instructions including a module that is the same as or similar to system generating module 812, in accordance with one or more embodiments.

Figure 12:
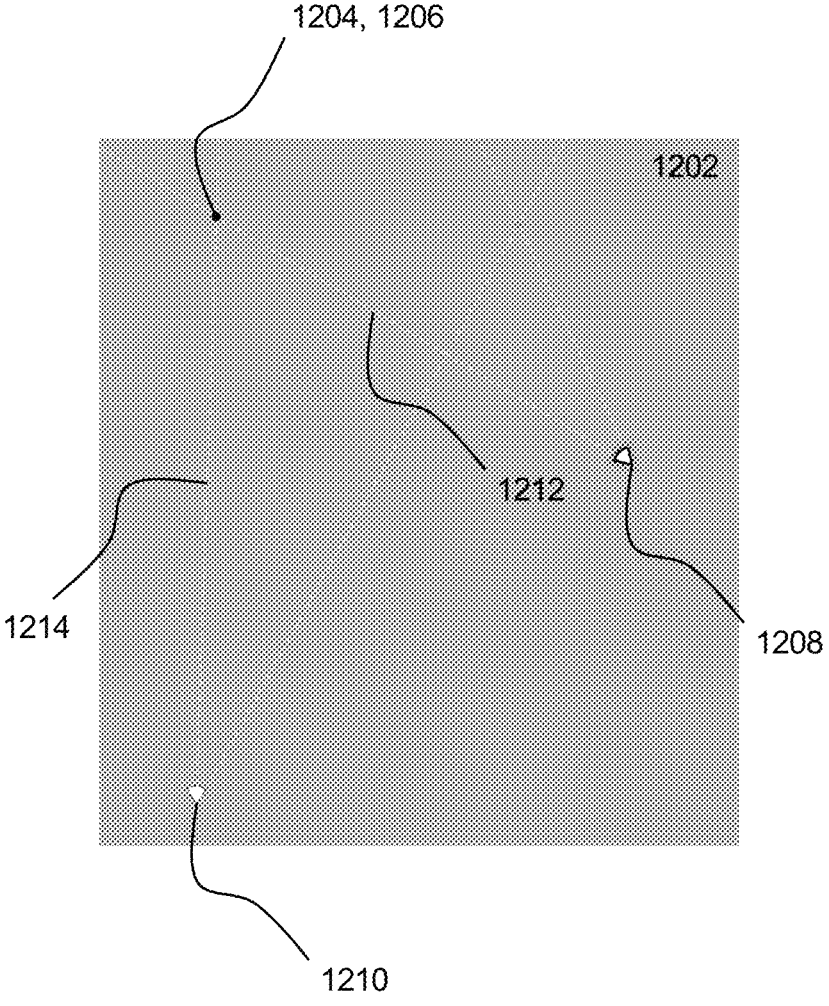
FIG. 12 illustrates a first ground plane, according to some embodiments.

In some embodiments, generating the first 3d coordinate system includes defining a first ground plane based on the first image, projecting the first end point onto the first ground plane, projecting the third end point onto the first ground plane, projecting the first camera location onto the first ground plane, projecting the second camera location onto the first ground plane, and calculating a first origin of the first 3d coordinate system based on an intersection of a first line connecting the projected first camera location and the projected first end point and a second line connecting the projected second camera location and the projected third end point. Referring briefly to FIG. 12, it illustrates a ground plane 1202, according to some embodiments. FIG. 12 illustrates a first ground plane 1202, a projected first end point 1204, projected third end point 1206, a projected first camera location 1208, a projected second camera location 1210, a first line 1212 connecting the projected first camera location 1208 and the first end point 1204, and a second line 1214 connecting the projected second camera location 1210 and the third end point 1206. A first origin of a first 3d coordinate system is calculated based on the intersection of the first line 1212 and the second line 1214.

In some embodiments, generating the first 3d coordinate system includes projecting the first origin of the first 3d coordinate system orthogonally relative to the first ground plane based on the first end point. In some embodiments, generating the first 3d coordinate system includes rotating axes of the first 3d coordinate system based on the first 2d line segment. In some embodiments, rotating the axes of the first 3d coordinate system is further based on a slope of the first 2d line segment. In some embodiments, rotating the axes of the first 3d coordinate system includes aligning an axis of the axes of the first 3d coordinate system with the first 2d line segment. In some embodiments, the aligned axis of the axes of the first 3d coordinate system is parallel with the first 2d line segment. In some embodiments, rotating the axes of the first 3d coordinate system is further based on a gravity vector associated with the first image.

An operation 912 may include generating a second 3d coordinate system based on the first camera pose, the second camera pose, the first 2d line segment, and the second 2d line segment. Operation 912 may be performed by one or more hardware processors configured by machine-readable instructions including a module that is the same as or similar to 3d generating module 814, in accordance with one or more embodiments.

Figure 13:
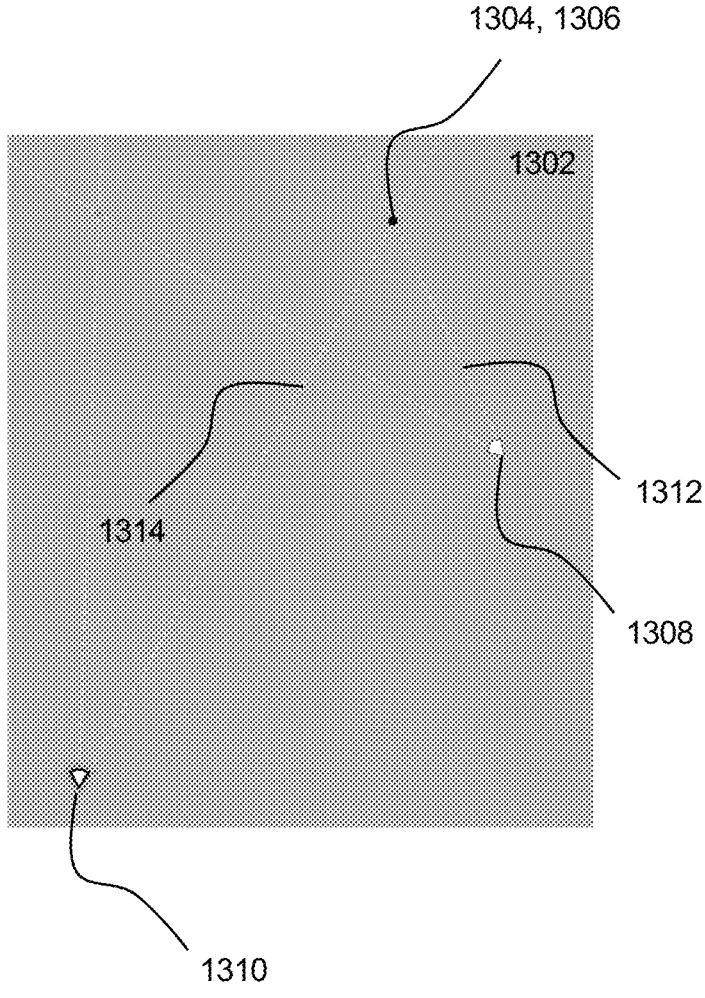
FIG. 13 illustrates a second ground plane, according to some embodiments.

In some embodiments, generating the second 3d coordinate system includes defining a second ground plane based on the second image, projecting the second end point onto the second ground plane, projecting the fourth end point onto the second ground plane, projecting the first camera location onto the second ground plane, projecting the second camera location onto the second ground plane, and calculating a second origin of the second 3d coordinate system based on an intersection of a third line connecting the projected first camera location and the projected second end point and a fourth line connecting the projected second camera location and the projected fourth end point. Referring briefly to FIG. 13, it illustrates a second ground plane 1302, according to some embodiments. FIG. 13 illustrates a second ground plane 1302, a projected second end point 1304, a projected fourth end point 1306, a projected first camera location 1308, a projected second camera location 1310, a third line 1312 connecting the projected first camera location 1308 and the projected second end point 1304, and a fourth line 1314 connecting the projected second camera location 1310 and the projected fourth end point 1306. A second origin of a second 3d coordinate system is calculated based on the intersection of the first line 1312 and the second line 1314.

In some embodiments, generating the second 3d coordinate system includes projecting the second origin of the second 3d coordinate system orthogonally relative to the second ground plane based on the fourth end point. In some embodiments, generating the second 3d coordinate system includes rotating axes of the second 3d coordinate system based on the second 2d line segment. In some embodiments, rotating the axes of the second 3d coordinate system is further based on a slope of the second 2d line segment. In some embodiments, rotating the axes of the second 3d coordinate system includes aligning an axis of the axes of the second 3d coordinate system with the second 2d line segment. In some embodiments, the aligned axis of the axes of the second 3d coordinate system is parallel with the second 2d line segment. In some embodiments, rotating the axes of the second 3d coordinate system is further based on a gravity vector associated with the second image.

An operation 914 may include calculating a score based on the first 3d coordinate system and the second 3d coordinate system. Operation 914 may be performed by one or more hardware processors configured by machine-readable instructions including a module that is the same as or similar to score calculation module 816, in accordance with one or more embodiments.

In some embodiments, method 900 includes generating a third line segment and generating a fourth line segment. The third line segment includes a fifth end point and a sixth end point, wherein the fifth end point may be colinear with the sixth end point, wherein the fifth end point corresponds to the projected first origin of the first 3d coordinate system, and wherein the sixth end point correspond to a projection of the second end point onto a horizontal vector of an axis of the axes of the first 3d coordinate system. The fourth line segment includes a seventh end point and an eighth end point, wherein the seventh end point may be colinear with the eighth end point, wherein the seventh end point corresponds to the projected second origin of the second 3d coordinate system, and wherein the eighth end point correspond to a projection of the third end point onto a horizontal vector of an axis of the axes of the second 3d coordinate system. In some embodiments, method 900 includes calculating an average of a length of the third line segment and a length of the fourth line segment. In these embodiments, calculating the score of operation 914 is further based on the average. In some embodiments, method 900 includes calculating a difference between a length of the third line segment and a length of the fourth line segment. In these embodiments, calculating the score of operation 914 is further based on the difference.

In some embodiments, method 900 includes calculating an origin displacement based on a linear distance between the projected first origin of the first 3d coordinate system and the projected second origin of the second 3d coordinate system. In these embodiments, calculating the score of operation 914 is further based on the origin displacement.

In some embodiments, method 900 includes calculating a first angular difference between the first camera location and the second camera location based on the projected first origin of the first 3d coordinate system. In these embodiments, calculating the score of operation 914 is further based on the first angular difference. In some embodiments, method 900 includes calculating a second angular difference between the first camera location and the second camera location based on the projected second origin of the second 3d coordinate system. In these embodiments, calculating the score of operation 914 is further based on the second angular difference. In some embodiments, method 900 includes calculating a third angular difference between a first vector and the first 2d line segment, wherein the first vector is defined by the first camera location and the aligned axis of the axes of the first 3d coordinate system. In these embodiments, calculating the score of operation 914 is further based on the third angular difference. In some embodiments, method 900 includes calculating a fourth angular difference between a second vector and the second 2d line segment, wherein the second vector is defined by the second camera location and the aligned axis of the axes of the second 3d coordinate system. In these embodiments, calculating the score of operation 914 is further based on the fourth angular difference.

Figure 14:
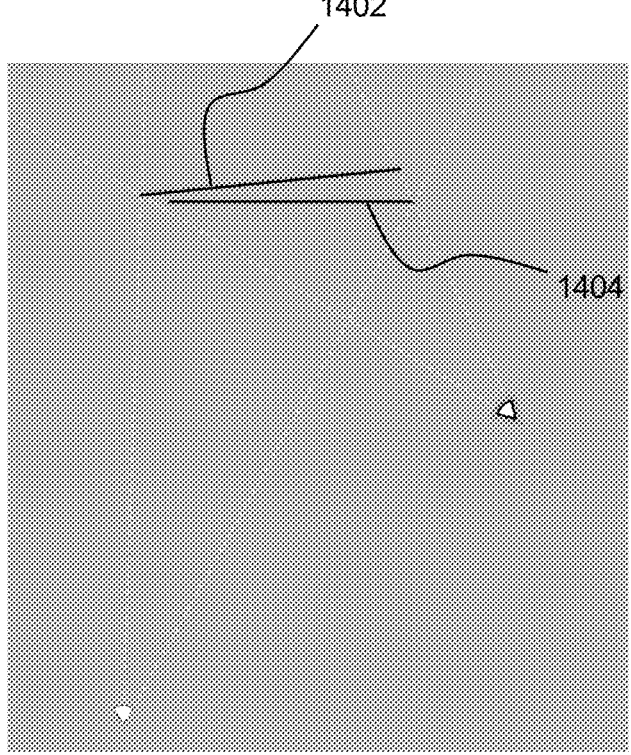
FIG. 14 illustrates a ground plane, according to some embodiments.

In some embodiments, for example as illustrated in FIGS. 12 and 13, the end points of the first 2d line segment are assumed to be fixed. Specifically, in FIG. 12, the first end point 1004 of the first 2d line segment 1002 is assumed to be fixed, and in FIG. 13, the second end point 1006 of the first 2d line segment 1002 is assumed to be fixed. In these embodiments, there are two candidate positions for origins of coordinate systems (i.e., the first origin of first 3d coordinate system and the second origin of the second 3d coordinate system). Referring briefly to FIG. 14, it illustrates a ground plane, according to some embodiments. Line segment 1402 is a projection of the first 2d line segment 1002 onto a ground plane assuming the first end point 1004 of the first 2d line segment 1002 is fixed. Line segment 1404 is a projection of the first 2d line segment 1002 onto a ground plane assuming the second end point 1006 of the first 2d line segment 1002 is fixed.

Figure 15:
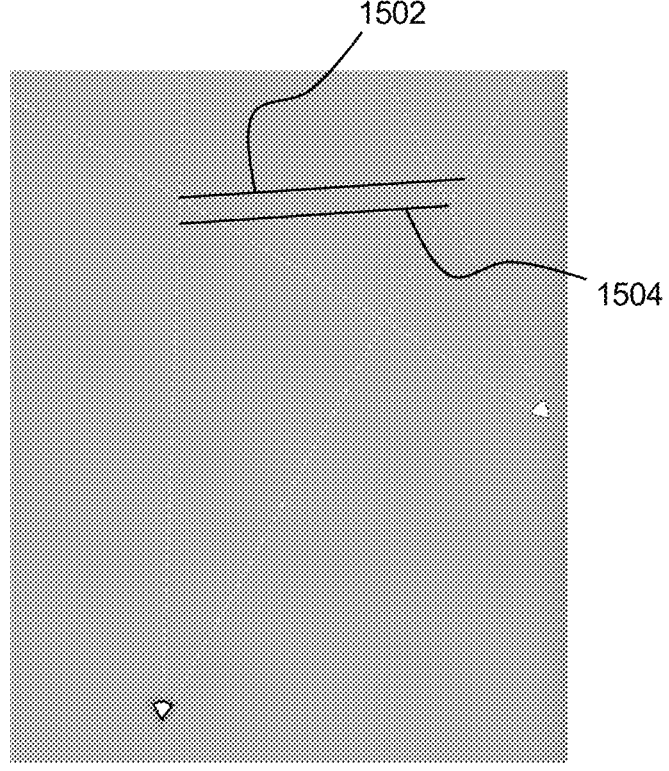
FIG. 15 illustrates a ground plane, according to some embodiments.

In some embodiments, the end points of the second 2d line segment are assumed to be fixed. In these embodiments, there are two candidate positions for origins of coordinate systems. Referring briefly to FIG. 15, it illustrates a ground plane, according to some embodiments. Line segment 1502 is a projection of the second 2d line segment 1102 onto a ground plane assuming the third end point 1104 of the second 2d line segment 1102 is fixed. Line segment 1504 is a projection of the second 2d line segment 1102 onto a ground plane assuming the fourth end point 1106 of the second 2d line segment 1102 is fixed.

Figure 16:
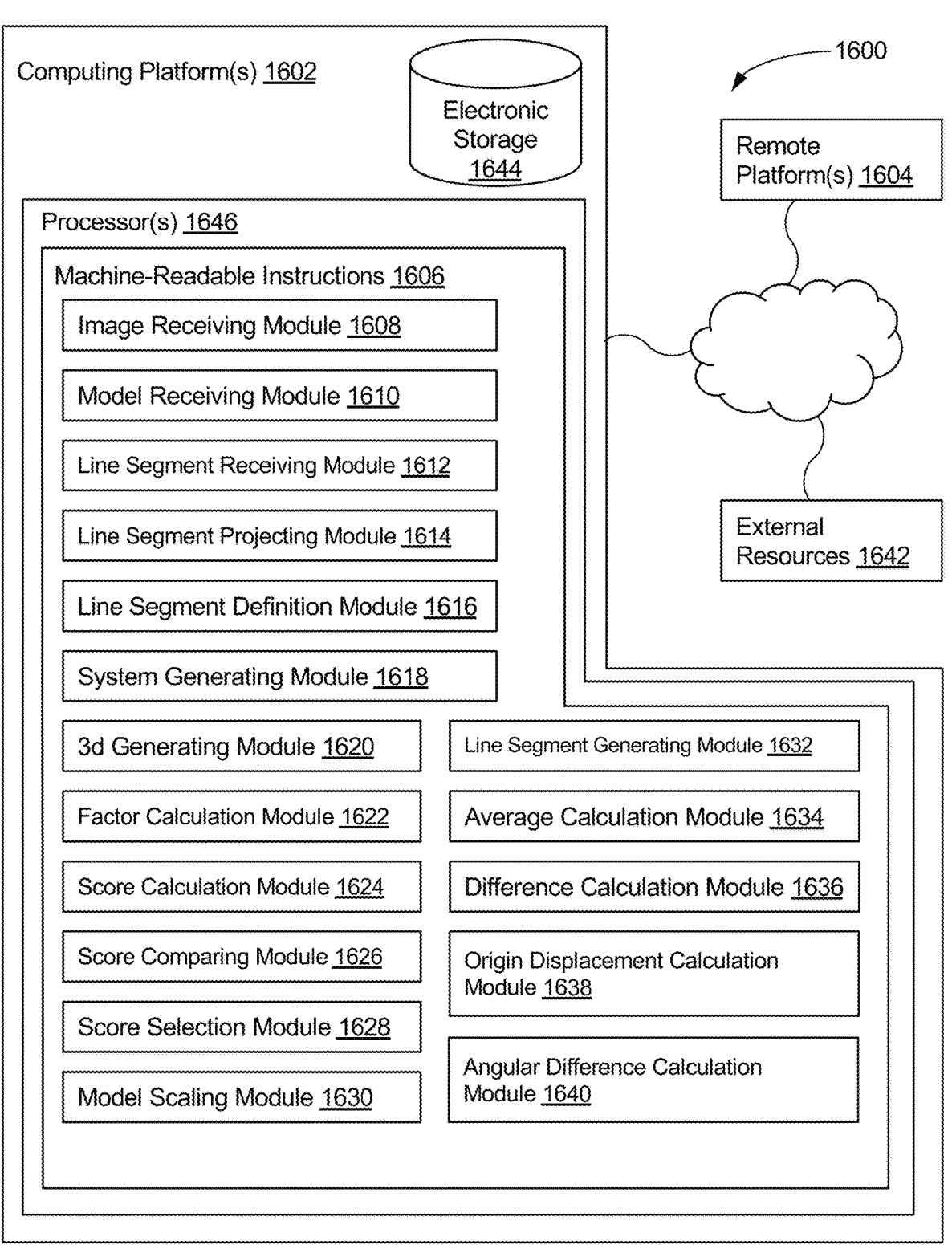
FIG. 16 illustrates a system configured scaling a three-dimensional model, according to some embodiments.

FIG. 16 illustrates a system 1600 configured scaling a three-dimensional model, in accordance with one or more embodiments. In some embodiments, system 1600 may include one or more computing platforms 1602. Computing platform(s) 1602 may be configured to communicate with one or more remote platforms 1604 according to a client/server architecture, a peer-to-peer architecture, and/or other architectures. Remote platform(s) 1604 may be configured to communicate with other remote platforms via computing platform(s) 1602 and/or according to a client/server architecture, a peer-to-peer architecture, and/or other architectures. Users may access system 1600 via remote platform(s) 1604.

Computing platform(s) 1602 may be configured by machine-readable instructions 1606. Machine-readable instructions 1606 may include one or more instruction modules. The instruction modules may include computer program modules. The instruction modules may include one or more of image receiving module 1608, model receiving module 1610 (e.g., 3d model receiving module 1610), line segment receiving module 1612, line segment projecting module 1614, line segment definition module 1616, system generating module 1618 (e.g., 3d coordinate system generation module 1618), 3d generating module 1620 (e.g., 3d coordinate system generation module 1620), factor calculation module 1622, score calculation module 1624, score comparing module 1626, score selection module 1628, model scaling module 1630, line segment generating module 1632, average calculation module 1634, difference calculation module 1636, origin displacement calculation module 1638, angular difference calculation module 1640, and/or other instruction modules.

Image receiving module 1608 may be configured to receive a plurality of images and a plurality of first camera poses associated with the plurality of images.

Model receiving module 1610 may be configured to receive a three-dimensional (3d) model generated based on the plurality of images and a plurality of second camera poses associated with the 3d model.

Line segment receiving module 1612 may be configured to receive/detect a 3d line segment of the 3d model.

Line segment projecting module 1614 may be configured to, for each pair of images in the plurality of images, project the 3d line segment onto a first image of the pair of images. The first 2d line segment may correspond to a real-world object depicted in the first image. The first 2d line segment may correspond to an attribute of the first image. The first 2d line segment may be horizontal relative to a first ground plane based on the first image. Generating the first 3d coordinate system may include defining a first ground plane based on the first image.

The first image may be associated with a first camera pose including a first camera location and a first camera orientation. Generating the first 3d coordinate system may include projecting the first camera location onto the first ground plane.

Line segment projecting module 1614 may be configured to, for each pair of images in the plurality of images, project the 3d line segment onto a second image of the pair of images. The second image may be associated with a second camera pose including a second camera location and a second camera orientation. Generating the first 3d coordinate system may include projecting the second camera location onto the first ground plane.

Line segment definition module 1616 may be configured to, for each pair of images in the plurality of images, define a first two-dimensional (2d) line segment in the first image based on the 3d line segment projected onto the first image. The first 2d line segment may include a first end point and a second end point. Generating the first 3d coordinate system may include projecting the first end point onto the first ground plane. Generating the first 3d coordinate system may further include projecting the first origin of the first 3d coordinate system orthogonally relative to the first ground plane based on the first end point. Generating the first 3d coordinate system may further include rotating axes of the first 3d coordinate system based on the first 2d line segment.

Rotating the axes of the first 3d coordinate system may be further based on a slope of the first 2d line segment. Rotating the axes of the second 3d coordinate system may be further based on a slope of the second 2d line segment. Rotating the axes of the first 3d coordinate system may include aligning an axis of the axes of the first 3d coordinate system with the first 2d line segment. Rotating the axes of the second 3d coordinate system may include aligning an axis of the axes of the second 3d coordinate system with the second 2d line segment. Rotating the axes of the first 3d coordinate system may be further based on a gravity vector associated with the first image. Rotating the axes of the second 3d coordinate system may be further based on a gravity vector associated with the second image.

Line segment definition module 1616 may be configured to, for each pair of images in the plurality of images, define a second 2d line segment in the second image based on the 3d line segment projected onto the second image. The second 2d line segment may correspond to the real-world object depicted in the second image. The second 2d line segment may correspond to the attribute of the second image. The second 2d line segment may be horizontal relative to a second ground plane based on the second image. The second 2d line segment may include a third end point and a fourth end point.

The first end point may correspond to the third end point and the second end point corresponds to the fourth end point. Generating the first 3d coordinate system may include projecting the third end point onto the first ground plane.

System generating module 1618 may be configured to, for each pair of images in the plurality of images, generate a first three-dimensional (3d) coordinate system based on a first camera pose of the first camera poses associated with the first image, a second camera pose of the first camera poses associated with the second image, the first 2d line segment, and the second 2d line segment.

3d generating module 1620 may be configured to, for each pair of images in the plurality of images, generate a second 3d coordinate system based on the first camera pose of the first camera poses, the second camera pose of the first camera poses, the first 2d line segment, and the second 2d line segment. Generating the second 3d coordinate system may include defining a second ground plane based on the second image. Generating the second 3d coordinate system may include projecting the second end point onto the second ground plane. Generating the second 3d coordinate system may include projecting the fourth end point onto the second ground plane. Generating the second 3d coordinate system may include projecting the first camera location onto the second ground plane.

Generating the second 3d coordinate system may include projecting the second camera location onto the second ground plane. Generating the second 3d coordinate system may include calculating a second origin of the second 3d coordinate system based on an intersection of a third line connecting the projected first camera location and the projected second end point and a fourth line connecting the projected second camera location and the projected fourth end point. Generating the second 3d coordinate system may further include projecting the second origin of the second 3d coordinate system orthogonally relative to the second ground plane based on the fourth end point. Generating the second 3d coordinate system may further include rotating axes of the second 3d coordinate system based on the second 2d line segment.

Factor calculation module 1622 may be configured to, for each pair of images in the plurality of images, calculate a scaling factor based on the first 3d coordinate system, the second 3d coordinate system, and the 3d line segment.

Score calculation module 1624 may be configured to, for each pair of images in the plurality of images, calculate a score based on the scaling factor. In some embodiments, the scaling factor is associated with the score.

Score comparing module 1626 may be configured to compare the scores of the pairs of images.

Score selection module 1628 may be configured to select a score of the scores of the pairs of images based on the comparison.

Model scaling module 1630 may be configured to scale the 3d model using a scaling factor associated with the selected score.

Line segment generating module 1632 may be configured to generate a third line segment. Calculating the scaling factor may include comparing a length of the third line segment to a length of the 3d line segment. The third line segment may include a fifth end point and a sixth end point. The fifth end point may correspond to the projected first origin of the first 3d coordinate system. The sixth end point may correspond to a projection of the second end point onto a horizontal vector of an axis of the axes of the first 3d coordinate system.

Line segment generating module 1632 may be configured to generate a fourth line segment. Calculating the scaling factor may include comparing a length of the fourth line segment to a length of the 3d line segment. The fourth line segment may include a seventh end point and an eighth end point. The seventh end point may correspond to the projected second origin of the second 3d coordinate system. The eighth end point may correspond to a projection of the third end point onto a horizontal vector of an axis of the axes of the second 3d coordinate system.

Average calculation module 1634 may be configured to calculate an average of a length of the third line segment and a length of the fourth line segment. Calculating the scaling factor may be further based on the average. Calculating the scaling factor may include calculating a difference between the average and a length of the 3d line segment.

Difference calculation module 1636 may be configured to calculate a difference between a length of the third line segment and a length of the fourth line segment. Comparing the length of the third line segment to the length of the 3d line segment may include calculating a difference between the length of the third line segment and the length of the 3d line segment. Comparing the length of the fourth line segment to the length of the 3d line segment may include calculating a difference between the length of the fourth line segment and the length of the 3d line segment. Calculating the score may be further based on the difference.

Origin displacement calculation module 1638 may be configured to calculate an origin displacement based on a linear distance between the projected first origin of the first 3d coordinate system and the projected second origin of the second 3d coordinate system. Calculating the score may be further based on the origin displacement.

Angular difference calculation module 1640 may be configured to calculate a first angular difference between the first camera location and the second camera location based on the projected first origin of the first 3d coordinate system. Calculating the score may be further based on the first angular difference.

Angular difference calculation module 1640 may be configured to calculate a second angular difference between the first camera location and the second camera location based on the projected second origin of the second 3d coordinate system. Calculating the score may be further based on the second angular difference.

Angular difference calculation module 1640 may be configured to calculate a third angular difference between a first vector and the first 2d line segment. Calculating the score may be further based on the third angular difference. The first vector may be defined by the first camera location and the aligned axis of the axes of the first 3d coordinate system. The aligned axis of the axes of the first 3d coordinate system may be parallel with the first 2d line segment.

Angular difference calculation module 1640 may be configured to calculate a fourth angular difference between a second vector and the second 2d line segment. Calculating the score may be further based on the fourth angular difference. The second vector may be defined by the second camera location and the aligned axis of the axes of the second 3d coordinate system. The aligned axis of the axes of the second 3d coordinate system may be parallel with the second 2d line segment.

In some embodiments, generating the first 3d coordinate system may include calculating a first origin of the first 3d coordinate system based on an intersection of a first line connecting the projected first camera location and the projected first end point and a second line connecting the projected second camera location and the projected third end point.

In some embodiments, computing platform(s) 1602, remote platform(s) 1604, and/or external resources 1642 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which computing platform(s) 1602, remote platform(s) 1604, and/ or external resources 1642 may be operatively linked via some other communication media.

A given remote platform 1604 may include one or more processors configured to execute computer program modules. The computer program modules may be configured to enable an expert or user associated with the given remote platform 1604 to interface with system 1600 and/or external resources 1642, and/or provide other functionality attributed herein to remote platform(s) 1604. By way of non-limiting example, a given remote platform 1604 and/or a given computing platform 1602 may include one or more of a server, a desktop computer, a laptop computer, a handheld computer, a tablet computing platform, a NetBook, a Smartphone, a gaming console, and/or other computing platforms.

External resources 1642 may include sources of information outside of system 1600, external entities participating with system 1600, and/or other resources. In some embodiments, some or all of the functionality attributed herein to external resources 1642 may be provided by resources included in system 1600.

Computing platform(s) 1602 may include electronic storage 1644, one or more processors 1646, and/or other components. Computing platform(s) 1602 may include communication lines, or ports to enable the exchange of information with a network and/or other computing platforms. Illustration of computing platform(s) 1602 in FIG. 16 is not intended to be limiting. Computing platform(s) 1602 may include a plurality of hardware, software, and/or firmware components operating together to provide the functionality attributed herein to computing platform(s) 1602. For example, computing platform(s) 1602 may be implemented by a cloud of computing platforms operating together as computing platform(s) 1602.

Electronic storage 1644 may comprise non-transitory storage media that electronically stores information. The electronic storage media of electronic storage 1644 may include one or both of system storage that is provided integrally (i.e., substantially non-removable) with computing platform(s) 1602 and/or removable storage that is removably connectable to computing platform(s) 1602 via, for example, a port (e.g., a USB port, a firewire port, etc.) or a drive (e.g., a disk drive, etc.). Electronic storage 1644 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1644 may include one or more virtual storage resources (e.g., cloud storage, a virtual private network, and/or other virtual storage resources). Electronic storage 1644 may store software algorithms, information determined by processor(s) 1646, information received from computing platform(s) 1602, information received from remote platform(s) 1604, and/or other information that enables computing platform(s) 1602 to function as described herein.

Processor(s) 1646 may be configured to provide information processing capabilities in computing platform(s) 1602. As such, processor(s) 1646 may include one or more of a digital processor, an analog processor, a digital circuit designed to process information, an analog circuit designed to process information, a state machine, and/or other mechanisms for electronically processing information. Although processor(s) 1646 is shown in FIG. 16 as a single entity, this is for illustrative purposes only. In some embodiments, processor(s) 1646 may include a plurality of processing units. These processing units may be physically located within the same device, or processor(s) 1646 may represent processing functionality of a plurality of devices operating in coordination. Processor(s) 1646 may be configured to execute modules 1608, 1610, 1612, 1614, 1616, 1618, 1620, 1622, 1624, 1626, 1628, 1630, 1632, 1634, 1636, 1638, and/or 1640, and/or other modules. Processor(s) 1646 may be configured to execute modules 1608, 1610, 1612, 1614, 1616, 1618, 1620, 1622, 1624, 1626, 1628, 1630, 1632, 1634, 1636, 1638, and/or 1640, and/or other modules by software; hardware; firmware; some combination of software, hardware, and/or firmware; and/or other mechanisms for configuring processing capabilities on processor(s) 1646. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1608, 1610, 1612, 1614, 1616, 1618, 1620, 1622, 1624, 1626, 1628, 1630, 1632, 1634, 1636, 1638, and/or 1640 are illustrated in FIG. 16 as being implemented within a single processing unit, in embodiments in which processor(s) 1646 includes multiple processing units, one or more of modules 1608, 1610, 1612, 1614, 1616, 1618, 1620, 1622, 1624, 1626, 1628, 1630, 1632, 1634, 1636, 1638, and/or 1640 may be implemented remotely from the other modules. The description of the functionality provided by the different modules 1608, 1610, 1612, 1614, 1616, 1618, 1620, 1622, 1624, 1626, 1628, 1630, 1632, 1634, 1636, 1638, and/or 1640 described below is for illustrative purposes, and is not intended to be limiting, as any of modules 1608, 1610, 1612, 1614, 1616, 1618, 1620, 1622, 1624, 1626, 1628, 1630, 1632, 1634, 1636, 1638, and/or 1640 may provide more or less functionality than is described. For example, one or more of modules 1608, 1610, 1612, 1614, 1616, 1618, 1620, 1622, 1624, 1626, 1628, 1630, 1632, 1634, 1636, 1638, and/or 1640 may be eliminated, and some or all of its functionality may be provided by other ones of modules 1608, 1610, 1612, 1614, 1616, 1618, 1620, 1622, 1624, 1626, 1628, 1630, 1632, 1634, 1636, 1638, and/or 1640. As another example, processor(s) 1646 may be configured to execute one or more additional modules that may perform some or all of the functionality attributed below to one of modules 1608, 1610, 1612, 1614, 1616, 1618, 1620, 1622, 1624, 1626, 1628, 1630, 1632, 1634, 1636, 1638, and/or 1640.

Figure 17A:
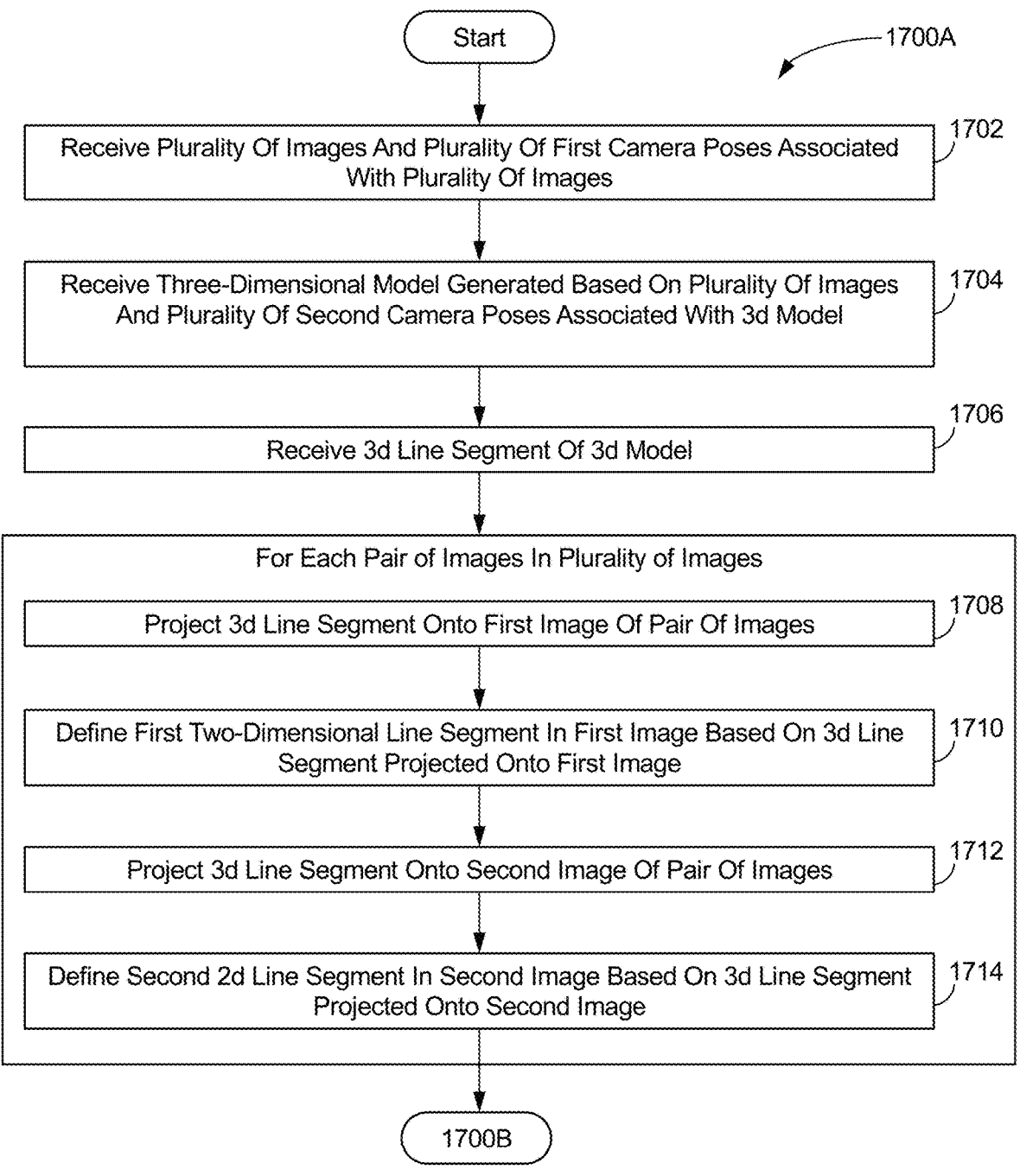
FIGS. 17A-17B illustrate a method scaling a three-dimensional model, according to some embodiments.
Figure 17B:
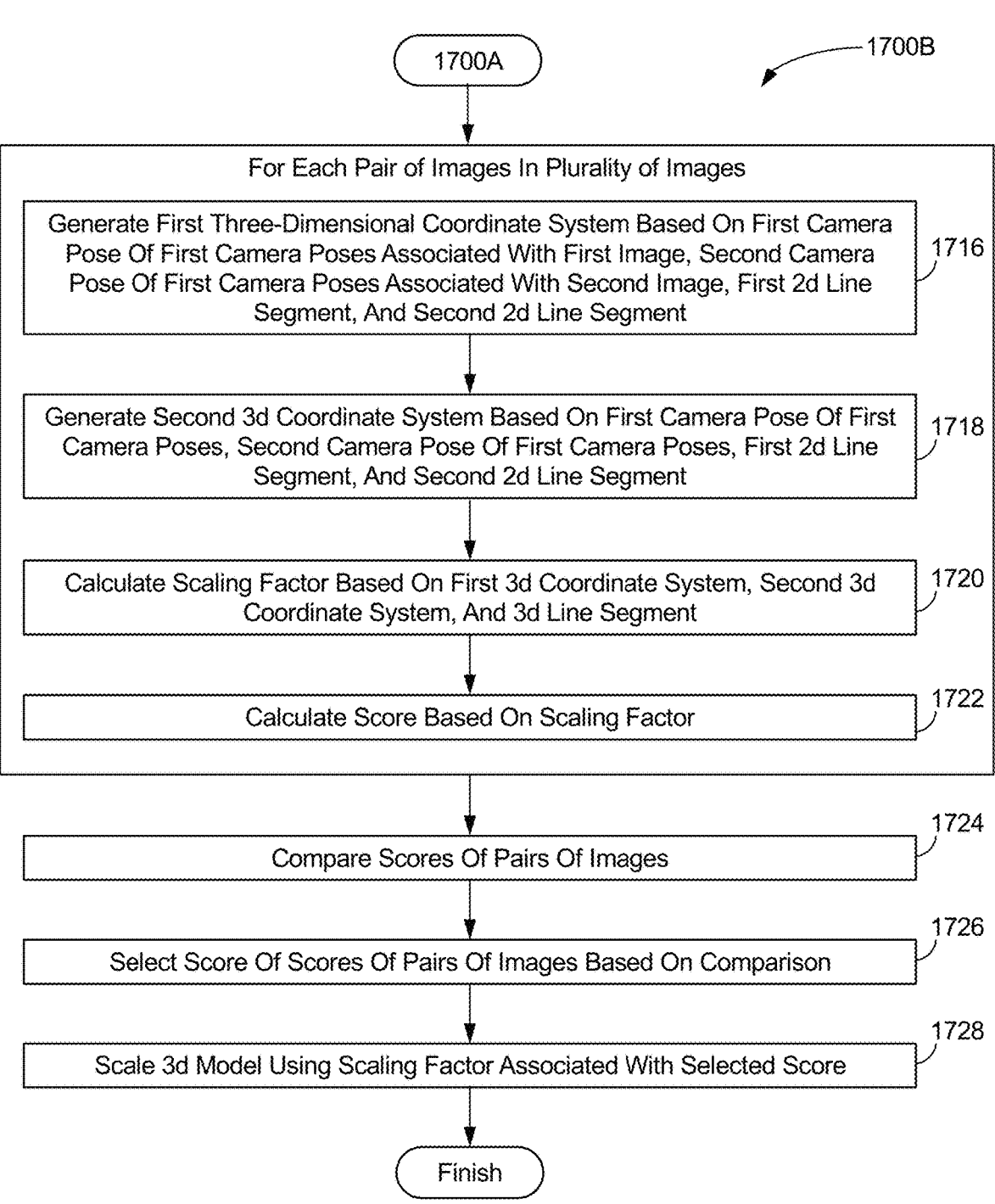

FIG. 17A illustrates a first part 1700A of a method of scaling a three-dimensional model, in accordance with one or more embodiments. FIG. 17B illustrates a second part 1700B of the method of scaling the three-dimensional model, in accordance with one or more embodiments. The operations of the first part 1700A and the second part 1700B of the method presented below are intended to be illustrative. In some embodiments, method may be accomplished with one or more additional operations not described, and/or without one or more of the operations discussed. Additionally, the order in which the operations of the first part 1700A and the second part 1700B of the method are illustrated in FIGS. 17A and 17B and described below is not intended to be limiting. The first part 1700A includes operations 1702, 1704, 1706, 1708, 1710, 1712, and 1714, and the second part 1700B includes operations 1716, 1718, 1720, 1722, 1724, 1726, and 1728.

In some embodiments, the first part 1700A and the second part 1700B of the method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the first part 1700A and the second part 1700B of the method in response to instructions stored electronically on an electronic storage medium. The one or more processing devices may include one or more devices configured through hardware, firmware, and/or software to be specifically designed for execution of one or more of the operations of the first part 1700A and the second part 1700B of the method.

An operation 1702 may include receiving a plurality of images and a plurality of first camera poses associated with the plurality of images. The plurality of images and the plurality of first camera poses may be associated with a capture coordinate system. Operation 1702 may be performed by one or more hardware processors configured by machine-readable instructions including a module that is the same as or similar to image receiving module 1608, in accordance with one or more embodiments.

An operation 1704 may include receiving a three-dimensional model generated based on the plurality of images and a plurality of second camera poses associated with the 3d model. The plurality of second camera poses may be associated with a modeling coordinate system. Operation 1704 may be performed by one or more hardware processors configured by machine-readable instructions including a module that is the same as or similar to model receiving module 1610, in accordance with one or more embodiments.

An operation 1706 may include receiving/detecting a 3d line segment of the 3d model. Operation 1706 may be performed by one or more hardware processors configured by machine-readable instructions including a module that is the same as or similar to line segment receiving module 1612, in accordance with one or more embodiments.

Operations 1708-1722 are relative to each pair of images in the plurality of images.

An operation 1708 may include projecting the 3d line segment onto a first image of the pair of images. The first image may be associated with a first camera pose including a first camera location and a first camera orientation. Operation 1708 may be performed by one or more hardware processors configured by machine-readable instructions including a module that is the same as or similar to line segment projecting module 1614, in accordance with one or more embodiments.

An operation 1710 may include defining a first two-dimensional (2d) line segment in the first image based on the 3d line segment projected onto the first image. The first 2d line segment may include a first end point and a second end point. The first end point may be colinear with the second end point. Operation 1710 may be performed by one or more hardware processors configured by machine-readable instructions including a module that is the same as or similar to line segment definition module 1616, in accordance with one or more embodiments.

An operation 1712 may include projecting the 3d line segment onto a second image of the pair of images. The second image may be associated with a second camera pose including a second camera location and a second camera orientation. Operation 1712 may be performed by one or more hardware processors configured by machine-readable instructions including a module that is the same as or similar to line segment projecting module 1614, in accordance with one or more embodiments.

An operation 1714 may include defining a second 2d line segment in the second image based on the 3d line segment projected onto the second image. The second 2d line segment may include a third end point and a fourth end point. The third end point may be colinear with the fourth end point. The first end point may correspond to the third end point and the second end point may correspond to the fourth end point. Operation 1714 may be performed by one or more hardware processors configured by machine-readable instructions including a module that is the same as or similar to line segment definition module 1616, in accordance with one or more embodiments.

In some embodiments, the first 2d line segment corresponds to a real-world object depicted in the first image and the second 2d line segment corresponds to the real-world object depicted in the second image. In some embodiments, the first 2d line segment may correspond to an attribute of the first image and the second 2d line segment may correspond to the attribute of the second image. In some embodiments, the first 2d line segment is horizontal relative to a first ground plane based on the first image and the second 2d line segment is horizontal relative to a second ground plane based on the second image.

An operation 1716 may include generating a first three-dimensional (3d) coordinate system based on a first camera pose of the first camera poses associated with the first image, a second camera pose of the first camera poses associated with the second image, the first 2d line segment, and the second 2d line segment. Operation 1716 may be performed by one or more hardware processors configured by machine-readable instructions including a module that is the same as or similar to system generating module 1618, in accordance with one or more embodiments.

In some embodiments, generating the first 3d coordinate system includes defining a first ground plane based on the first image, projecting the first end point onto the first ground plane, projecting the third end point onto the first ground plane, projecting the first camera location onto the first ground plane, projecting the second camera location onto the first ground plane, and calculating a first origin of the first 3d coordinate system based on an intersection of a first line connecting the projected first camera location and the projected first end point and a second line connecting the projected second camera location and the projected third end point. In some embodiments, generating the first 3d coordinate system further includes projecting the first origin of the first 3d coordinate system orthogonally relative to the first ground plane based on the first end point.

In some embodiments, generating the first 3d coordinate system further includes rotating axes of the first 3d coordinate system based on the first 2d line segment. In some embodiments, rotating the axes of the first 3d coordinate system is further based on a slope of the first 2d line segment. In some embodiments, rotating the axes of the first 3d coordinate system includes aligning an axis of the axes of the first 3d coordinate system with the first 2d line segment. In some embodiments, the aligned axis of the axes of the first 3d coordinate system is parallel with the first 2d line segment. In some embodiments, rotating the axes of the first 3d coordinate system is further based on a gravity vector associated with the first image.

An operation 1718 may include generating a second 3d coordinate system based on the first camera pose of the first camera poses, the second camera pose of the first camera poses, the first 2d line segment, and the second 2d line segment. Operation 1718 may be performed by one or more hardware processors configured by machine-readable instructions including a module that is the same as or similar to 3d generating module 1620, in accordance with one or more embodiments.

In some embodiments, generating the second 3d coordinate system includes defining a second ground plane based on the second image, projecting the second end point onto the second ground plane, projecting the fourth end point onto the second ground plane, projecting the first camera location onto the second ground plane, projecting the second camera location onto the second ground plane, and calculating a second origin of the second 3d coordinate system based on an intersection of a third line connecting the projected first camera location and the projected second end point and a fourth line connecting the projected second camera location and the projected fourth end point. In some embodiments, generating the second 3d coordinate system further includes projecting the second origin of the second 3d coordinate system orthogonally relative to the second ground plane based on the fourth end point.

In some embodiments, generating the second 3d coordinate system further includes rotating axes of the second 3d coordinate system based on the second 2d line segment. In some embodiments, rotating the axes of the second 3d coordinate system is further based on a slope of the second 2d line segment. In some embodiments, rotating the axes of the second 3d coordinate system includes aligning an axis of the axes of the second 3d coordinate system with the second 2d line segment. In some embodiments, the aligned axis of the axes of the second 3d coordinate system is parallel with the second 2d line segment. In some embodiments, rotating the axes of the second 3d coordinate system is further based on a gravity vector associated with the second image.

An operation 1720 may include calculating a scaling factor based on the first 3d coordinate system, the second 3d coordinate system, and the 3d line segment. Operation 1720 may be performed by one or more hardware processors configured by machine-readable instructions including a module that is the same as or similar to factor calculation module 1622, in accordance with one or more embodiments.

In some embodiments, method 1700 may further includes generating a third line segment, wherein the third line segment includes a fifth end point and a sixth end point, wherein the fifth end point may be colinear with the sixth end point, wherein the fifth end point corresponds to the projected first origin of the first 3d coordinate system, and wherein the sixth end point correspond to a projection of the second end point onto a horizontal vector of an axis of the axes of the first 3d coordinate system. In some embodiments, method 1700 further includes generating a fourth line segment, wherein the fourth line segment includes a seventh end point and an eighth end point, wherein the seventh end point may be colinear with the eight end point, wherein the seventh end point corresponds to the projected second origin of the second 3d coordinate system, and wherein the eighth end point correspond to a projection of the third end point onto a horizontal vector of an axis of the axes of the second 3d coordinate system.

In some embodiments, calculating the scaling factor includes comparing a length of the third line segment to a length of the 3d line segment. In some embodiments, comparing the length of the third line segment to the length of the 3d line segment includes calculating a difference between the length of the third line segment and the length of the 3d line segment. In some embodiments, calculating the scaling factor includes comparing a length of the fourth line segment to a length of the 3d line segment. In some embodiments, comparing the length of the fourth line segment to the length of the 3d line segment includes calculating a difference between the length of the fourth line segment and the length of the 3d line segment. In some embodiments, method 1700 further includes calculating an average of a length of the third line segment and a length of the fourth line segment. In these embodiments, calculating the scaling factor is further based on the average. In some embodiments, calculating the scaling factor includes calculating a difference between the average and a length of the 3d line segment. In some embodiments, method 1700 further includes calculating a difference between a length of the third line segment and a length of the fourth line segment. In these embodiments, calculating the score is further based on the difference.

An operation 1722 may include calculating a score based on the scaling factor. The scaling factor may be associated with the score. Operation 1722 may be performed by one or more hardware processors configured by machine-readable instructions including a module that is the same as or similar to score calculation module 1624, in accordance with one or more embodiments.

In some embodiments, method 1700 further includes calculating an origin displacement based on a linear distance between the projected first origin of the first 3d coordinate system and the projected second origin of the second 3d coordinate system. In these embodiments, calculating the score is further based on the origin displacement.

In some embodiments, method 1700 further includes calculating a first angular difference between the first camera location and the second camera location based on the projected first origin of the first 3d coordinate system. In these embodiments, calculating the score is further based on the first angular difference. In some embodiments, method 1700 further includes calculating a second angular difference between the first camera location and the second camera location based on the projected second origin of the second 3d coordinate system. In these embodiments, calculating the score is further based on the second angular difference. In some embodiments, method 1700 further includes calculating a third angular difference between a first vector and the first 2d line segment, wherein the first vector is defined by the first camera location and the aligned axis of the axes of the first 3d coordinate system. In these embodiments, calculating the score is further based on the third angular difference. In some embodiments, method 1700 further includes calculating a fourth angular difference between a second vector and the second 2d line segment, wherein the second vector is defined by the second camera location and the aligned axis of the axes of the second 3d coordinate system. In these embodiments, calculating the score is further based on the fourth angular difference.

An operation 1724 may include comparing the scores of the pairs of images. Operation 1724 may be performed by one or more hardware processors configured by machine-readable instructions including a module that is the same as or similar to score comparing module 1626, in accordance with one or more embodiments.

An operation 1726 may include selecting a score of the scores of the pairs of images based on the comparison. Operation 1726 may be performed by one or more hardware processors configured by machine-readable instructions including a module that is the same as or similar to score selection module 1628, in accordance with one or more embodiments.

An operation 1728 may include scaling the 3d model using a scaling factor associated with the selected score. Operation 1728 may be performed by one or more hardware processors configured by machine-readable instructions including a module that is the same as or similar to model scaling module 1630, in accordance with one or more embodiments.

Figure 18:
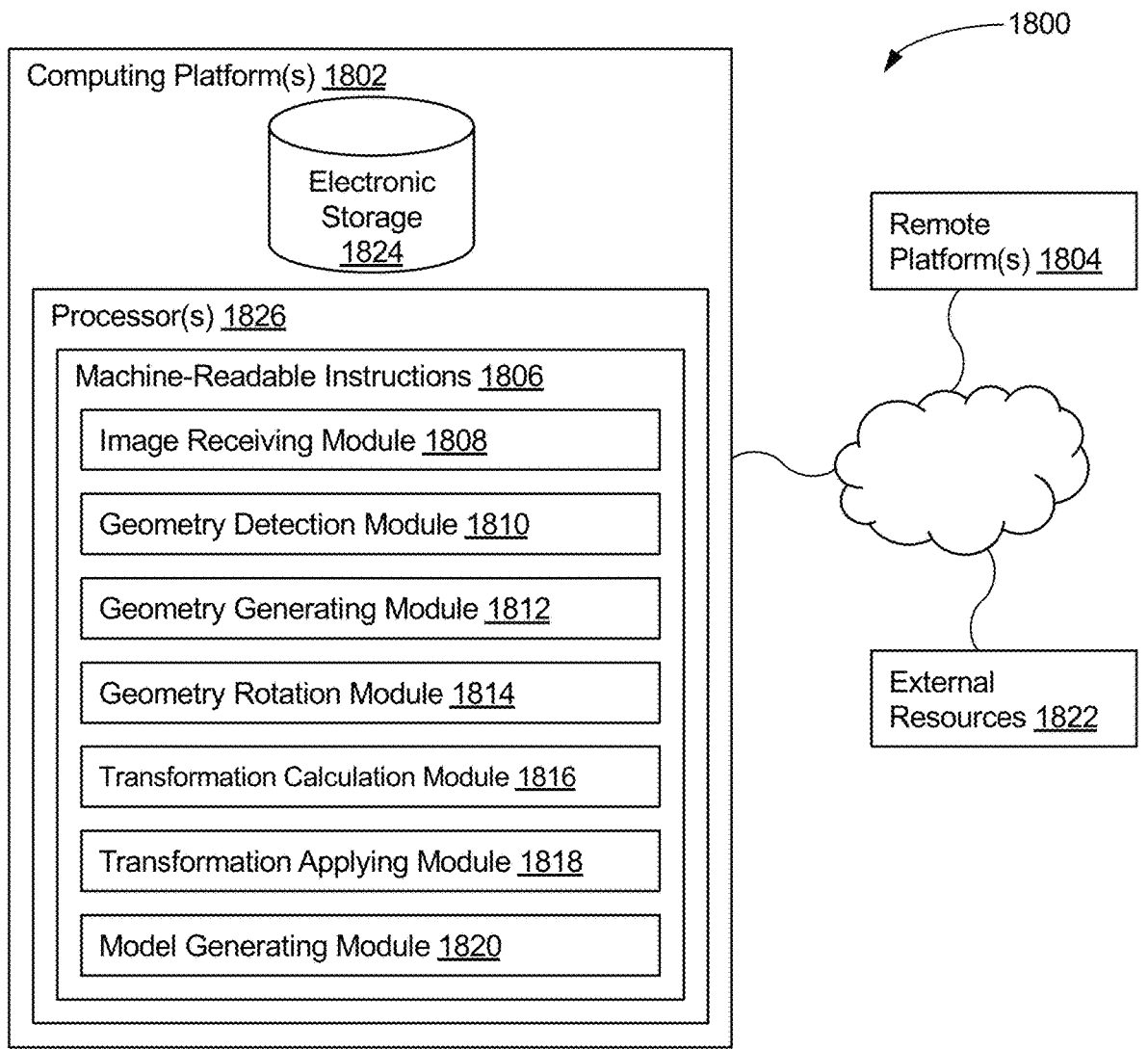
FIG. 18 illustrates a system configured for calculating an alignment transformation, according to some embodiments.

FIG. 18 illustrates a system 1800 configured for calculating an alignment transformation, in accordance with one or more implementations. In some implementations, system 1800 may include one or more computing platforms 1802. Computing platform(s) 1802 may be configured to communicate with one or more remote platforms 1804 according to a client/server architecture, a peer-to-peer architecture, and/or other architectures. Remote platform(s) 1804 may be configured to communicate with other remote platforms via computing platform(s) 1802 and/or according to a client/server architecture, a peer-to-peer architecture, and/or other architectures. Users may access system 1800 via remote platform(s) 1804.

Computing platform(s) 1802 may be configured by machine-readable instructions 1806. Machine-readable instructions 1806 may include one or more instruction modules. The instruction modules may include computer program modules. The instruction modules may include one or more of image receiving module 1808, geometry detection module 1810, geometry generating module 1812, geometry rotation module 1814, transformation calculation module 1816, transformation applying module 1818, model generating module 1820, and/or other instruction modules.

Image receiving module 1808 may be configured to receive a plurality of images and a plurality of poses associated with the plurality of images.

Geometry detection module 1810 may be configured to, for an image of the plurality of images, detect 2d geometry in the image. The 2d geometry may correspond to a real-world object depicted in the image.

Geometry generating module 1812 may be configured to, for an image of the plurality of images, generate 3d geometry for the image based on the 2d geometry. The 3d geometry may include simplified 3d geometry. The 3d geometry may correspond to the real-world object depicted in the image.

Geometry rotation module 1814 may be configured to, for an image of the plurality of images, rotate the 3d geometry to align the 3d geometry with the 2d geometry. Rotating the 3d geometry to align the 3d geometry with the 2d geometry may include rotating the 3d geometry to align the 3d geometry with the real-world object.

Transformation calculation module 1816 may be configured to, for an image of the plurality of images, calculate an alignment transformation based on the rotation.

Transformation applying module 1818 may be configured to, for an image of the plurality of images, apply the alignment transformation to the plurality of poses to generate a plurality of modified poses. Applying the alignment transformation to the plurality of poses may include applying the alignment transformation to poses of the plurality of poses associated with images of the plurality of images that include the 2d geometry. Applying the alignment transformation to the plurality of poses may include applying the alignment transformation to poses of the plurality of poses associated with images of the plurality of images that view the 3d geometry.

Model generating module 1820 may be configured to generate a 3d model based on the plurality of images and the plurality of modified poses.

In some implementations, computing platform(s) 1802, remote platform(s) 1804, and/or external resources 1822 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1802, remote platform(s) 1804, and/or external resources 1822 may be operatively linked via some other communication media.

A given remote platform 1804 may include one or more processors configured to execute computer program modules. The computer program modules may be configured to enable an expert or user associated with the given remote platform 1804 to interface with system 1800 and/or external resources 1822, and/or provide other functionality attributed herein to remote platform(s) 1804. By way of non-limiting example, a given remote platform 1804 and/or a given computing platform 1802 may include one or more of a server, a desktop computer, a laptop computer, a handheld computer, a tablet computing platform, a NetBook, a Smartphone, a gaming console, and/or other computing platforms.

External resources 1822 may include sources of information outside of system 1800, external entities participating with system 1800, and/or other resources. In some implementations, some or all of the functionality attributed herein to external resources 1822 may be provided by resources included in system 1800.

Computing platform(s) 1802 may include electronic storage 1824, one or more processors 1826, and/or other components. Computing platform(s) 1802 may include communication lines, or ports to enable the exchange of information with a network and/or other computing platforms. Illustration of computing platform(s) 1802 in FIG. 18 is not intended to be limiting. Computing platform(s) 1802 may include a plurality of hardware, software, and/or firmware components operating together to provide the functionality attributed herein to computing platform(s) 1802. For example, computing platform(s) 1802 may be implemented by a cloud of computing platforms operating together as computing platform(s) 1802.

Electronic storage 1824 may comprise non-transitory storage media that electronically stores information. The electronic storage media of electronic storage 1824 may include one or both of system storage that is provided integrally (i.e., substantially non-removable) with computing platform(s) 1802 and/or removable storage that is removably connectable to computing platform(s) 1802 via, for example, a port (e.g., a USB port, a firewire port, etc.) or a drive (e.g., a disk drive, etc.). Electronic storage 1824 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1824 may include one or more virtual storage resources (e.g., cloud storage, a virtual private network, and/or other virtual storage resources). Electronic storage 1824 may store software algorithms, information determined by processor(s) 1826, information received from computing platform(s) 1802, information received from remote platform(s) 1804, and/or other information that enables computing platform(s) 1802 to function as described herein.

Processor(s) 1826 may be configured to provide information processing capabilities in computing platform(s) 1802. As such, processor(s) 1826 may include one or more of a digital processor, an analog processor, a digital circuit designed to process information, an analog circuit designed to process information, a state machine, and/or other mechanisms for electronically processing information. Although processor(s) 1826 is shown in FIG. 18 as a single entity, this is for illustrative purposes only. In some implementations, processor(s) 1826 may include a plurality of processing units. These processing units may be physically located within the same device, or processor(s) 1826 may represent processing functionality of a plurality of devices operating in coordination. Processor(s) 1826 may be configured to execute modules 1808, 1810, 1812, 1814, 1816, 1818, and/or 1820, and/or other modules. Processor(s) 1826 may be configured to execute modules 1808, 1810, 1812, 1814, 1816, 1818, and/or 1820, and/or other modules by software; hardware; firmware; some combination of software, hardware, and/or firmware; and/or other mechanisms for configuring processing capabilities on processor(s) 1826. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1808, 1810, 1812, 1814, 1816, 1818, and/or 1820 are illustrated in FIG. 18 as being implemented within a single processing unit, in implementations in which processor(s) 1826 includes multiple processing units, one or more of modules 1808, 1810, 1812, 1814, 1816, 1818, and/or 1820 may be implemented remotely from the other modules. The description of the functionality provided by the different modules 1808, 1810, 1812, 1814, 1816, 1818, and/or 1820 described below is for illustrative purposes, and is not intended to be limiting, as any of modules 1808, 1810, 1812, 1814, 1816, 1818, and/or 1820 may provide more or less functionality than is described. For example, one or more of modules 1808, 1810, 1812, 1814, 1816, 1818, and/or 1820 may be eliminated, and some or all of its functionality may be provided by other ones of modules 1808, 1810, 1812, 1814, 1816, 1818, and/or 1820. As another example, processor(s) 1826 may be configured to execute one or more additional modules that may perform some or all of the functionality attributed below to one of modules 1808, 1810, 1812, 1814, 1816, 1818, and/or 1820.

Figure 19:
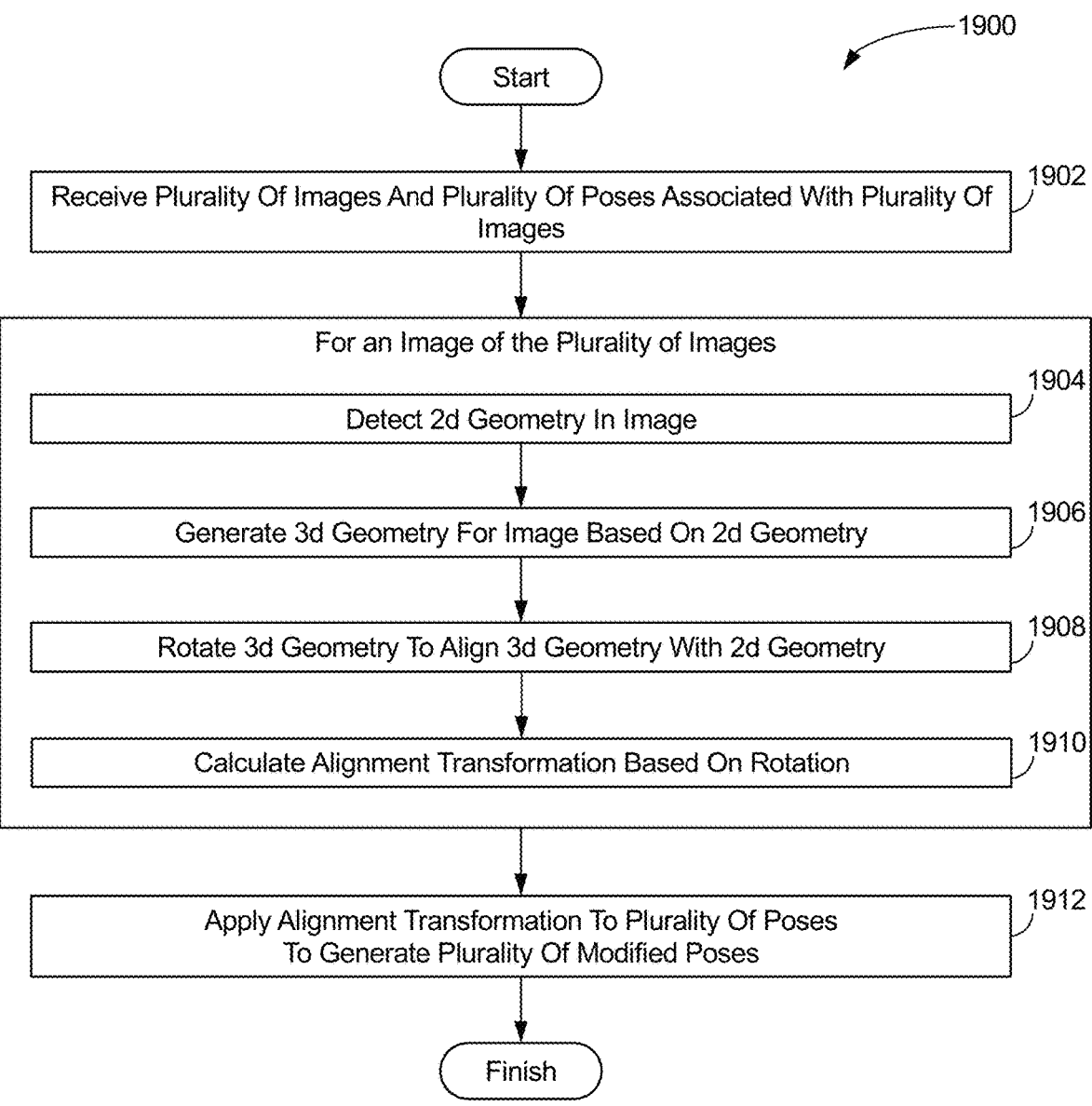
FIG. 19 illustrates a method for calculating an alignment transformation, according to some embodiments.

FIG. 19 illustrates a method 1900 for calculating an alignment transformation, in accordance with one or more implementations. The operations of method 1900 presented below are intended to be illustrative. In some implementations, method 1900 may be accomplished with one or more additional operations not described, and/or without one or more of the operations discussed. Additionally, the order in which the operations of method 1900 are illustrated in FIG. 19 and described below is not intended to be limiting.

In some implementations, method 1900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1900 in response to instructions stored electronically on an electronic storage medium. The one or more processing devices may include one or more devices configured through hardware, firmware, and/or software to be specifically designed for execution of one or more of the operations of method 1900.

An operation 1902 may include receiving a plurality of images and a plurality of poses associated with the plurality of images. The plurality of images and the plurality of poses may be associated with a capture coordinate system. Operation 1902 may be performed by one or more hardware processors configured by machine-readable instructions including a module that is the same as or similar to image receiving module 1808, in accordance with one or more implementations. In some embodiments, the plurality of poses associated with the plurality of images are within a capture coordinate system. In some embodiments, the capture coordinate system includes an origin and a plurality of axes: x-axis, y-axis, and z-axis.

Figure 20A:
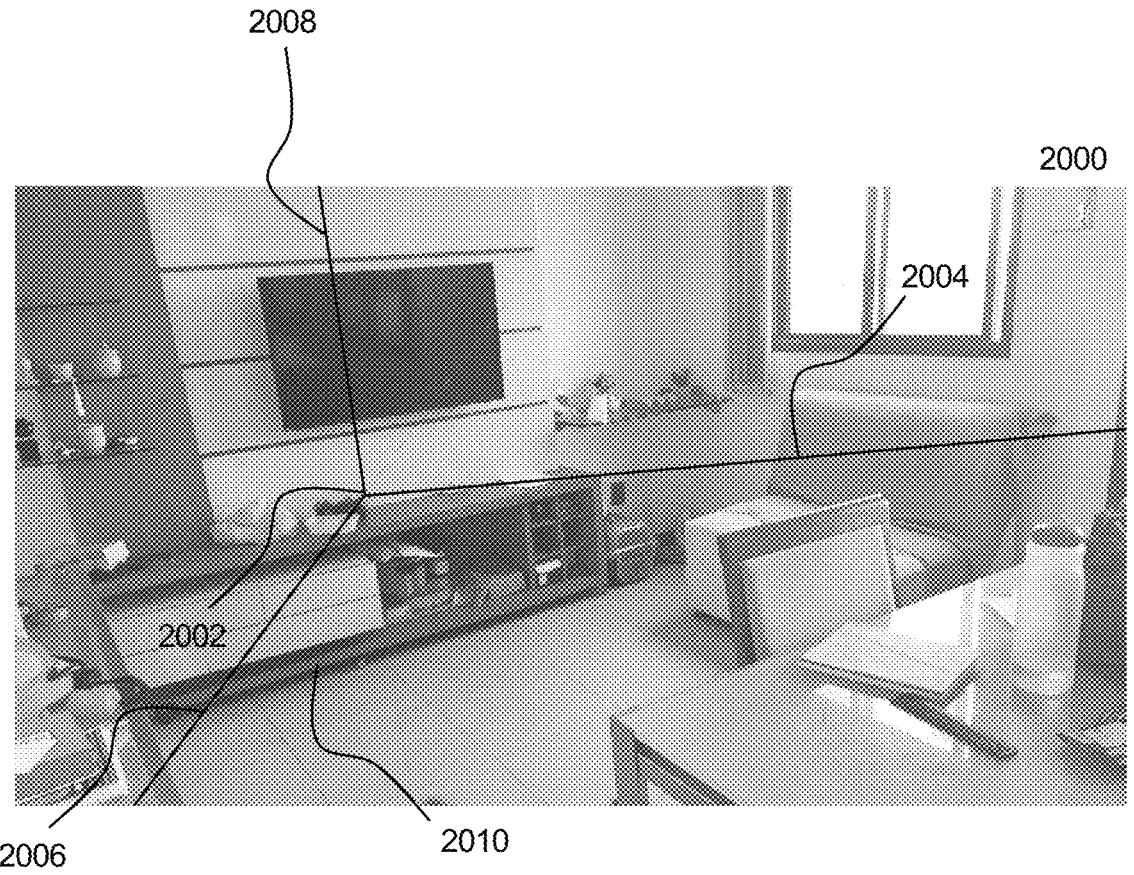
FIGS. 20A-20C illustrate an image of an environment, according to some embodiments.
Figure 20B:
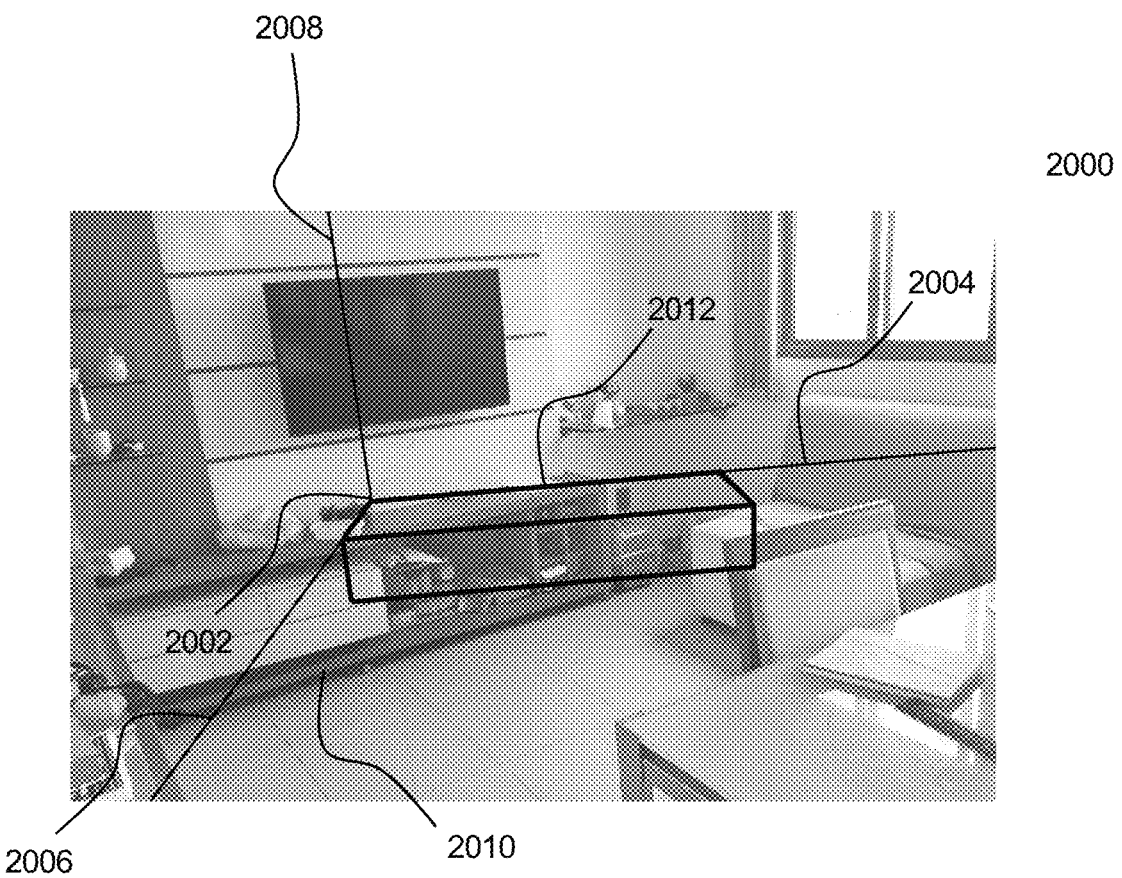
Figure 20C:
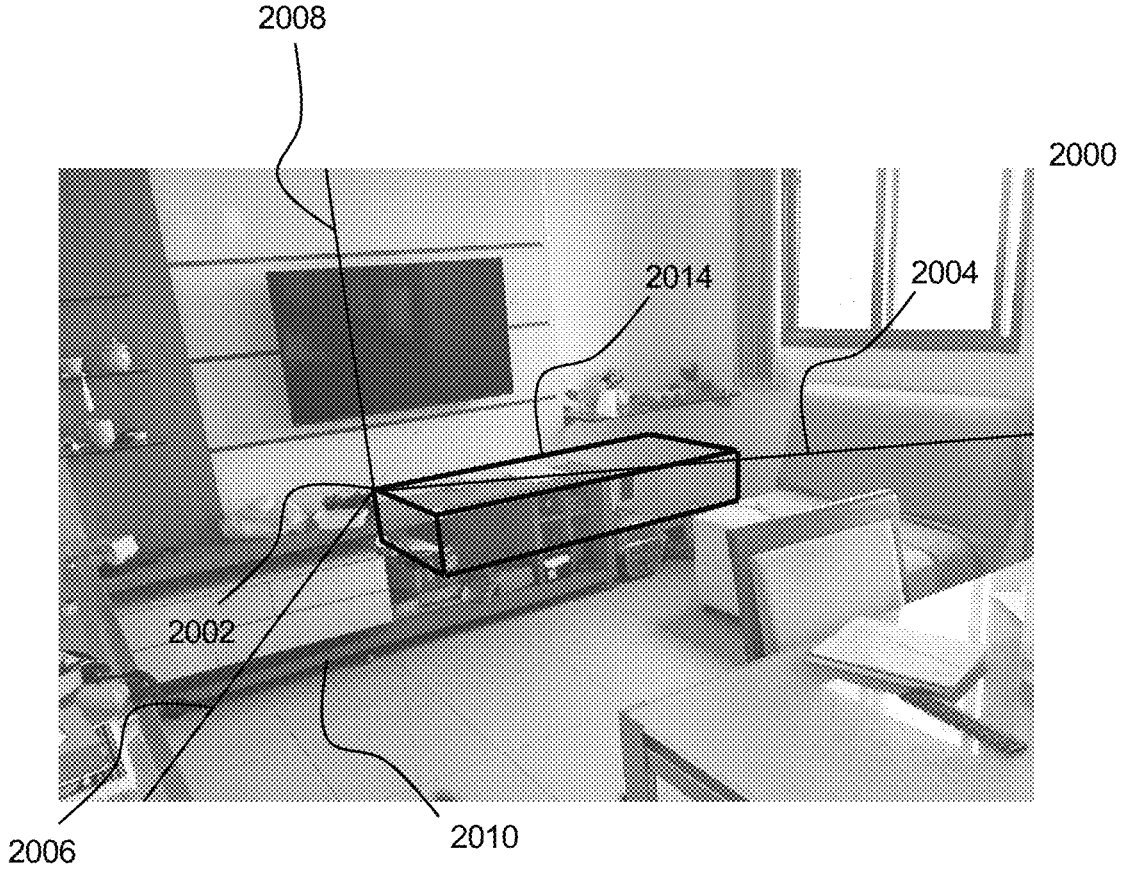

Operations 1904 through 1910 are relative to an image of the plurality of images. Referring briefly to FIGS. 20A-20C, they illustrate an image 2000 of an environment, according to some embodiments. FIGS. 20A-20C include an origin 2002 of a capture coordinate system and illustrate axes of the capture coordinate system: x-axis 2004, y-axis 2006, and z-axis 2008. A pose associated with the image 2000 is within the capture coordinate system.

An operation 1904 may include detecting 2d geometry in the image. Operation 1904 may be performed by one or more hardware processors configured by machine-readable instructions including a module that is the same as or similar to geometry detection module 110, in accordance with one or more implementations. In some embodiments, the 2d geometry corresponds to a real-world object depicted in the image. Referring briefly to FIG. 20A, it illustrates 2d geometry 2010. In this example, the 2d geometry 2010 corresponds to a television unit depicted in the image 2000. It is of note that the axes of the capture coordinate system do not align with the 2d geometry 2010.

An operation 1906 may include generating 3d geometry for the image based on the 2d geometry. Operation 1906 may be performed by one or more hardware processors configured by machine-readable instructions including a module that is the same as or similar to geometry generating module 1812, in accordance with one or more implementations. In some embodiments, the 3d geometry corresponds to the real-world object depicted in the image. In some embodiments, the 3d geometry includes simplified 3d geometry. Examples of simplified 3d geometry includes cuboids and the like. Referring briefly to FIG. 20B, it illustrates 3d geometry 2012. In this example, the 3d geometry 2012 is based on the 2d geometry 2010. In this example, the 3d geometry 2012 corresponds to the television unit depicted in the image 2000.

An operation 1908 may include rotating the 3d geometry to align the 3d geometry with the 2d geometry. Operation 1908 may be performed by one or more hardware processors configured by machine-readable instructions including a module that is the same as or similar to geometry rotation module 1814, in accordance with one or more implementations. In some embodiments, rotating the 3d geometry to align the 3d geometry with the 2d geometry includes rotating the 3d geometry to align the 3d geometry with the real-world object. Referring briefly to FIG. 20C, it illustrates rotated 3d geometry 2014. In this example, the rotated 3d geometry 2014 aligns with the 2d geometry 2010. In this example, the rotated 3d geometry aligns with the television unit depicted in the image 2000.

An operation 1910 may include calculating an alignment transformation based on the rotation. Operation 1910 may be performed by one or more hardware processors configured by machine-readable instructions including a module that is the same as or similar to transformation calculation module 1816, in accordance with one or more implementations. In some embodiments, calculating the alignment transformation is based on differences between axes of the capture coordinate system and axes associated with the rotated 3d geometry. In some embodiments, the differences are rotational differences about a z-axis. In some embodiments, the axes associated with the rotated 3d geometry are based on intersections of surfaces of the rotated 3d geometry.

An operation 1912 may include applying the alignment transformation to the plurality of poses to generate a plurality of modified poses. Operation 1912 may be performed by one or more hardware processors configured by machine-readable instructions including a module that is the same as or similar to transformation applying module 1818, in accordance with one or more implementations. In some embodiments, applying the alignment transformation to the plurality of poses includes applying the alignment transformation to poses of the plurality of poses associated with images of the plurality of images that include the 2d geometry, or portions thereof. In some embodiments, applying the alignment transformation to the plurality of poses includes applying the alignment transformation to poses of the plurality of poses associated with images of the plurality of images that view the 3d geometry, or portions thereof.

Figure 21:
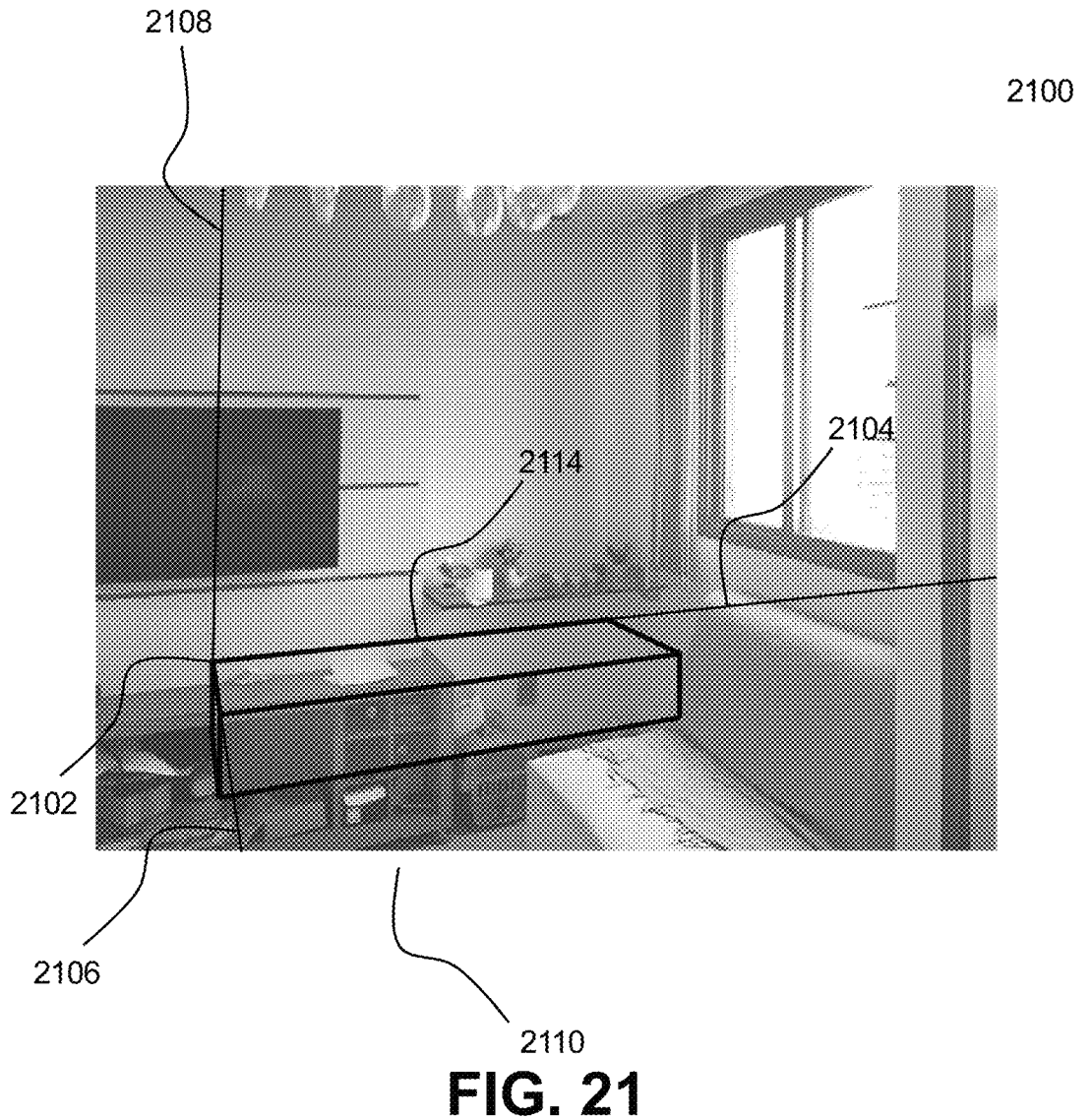
FIG. 21 illustrates an image of an environment, according to some embodiments.

In some embodiments, operation 1912 may include applying the alignment transformation to the capture coordinate system to generate a modified coordinate system. In some embodiments, applying the alignment transformation to the capture coordinate system may include applying the alignment transformation to the axes of the capture coordinate system. In some embodiments, the modified coordinate system is a modeling coordinate system. Referring briefly to FIG. 21, it illustrates an image 2100 of an environment, according to some embodiments. FIG. 21 includes an origin 2102 of a modified coordinate system and illustrates axes of the modified coordinate system: x-axis 2104, y-axis 2106, and z-axis 2108. It is of note that the axes of the modified coordinate system align with the 2d geometry 2010. In some embodiments, the modified coordinate system is a modeling coordinate system.

In some embodiments, method 1900 further includes generating a 3d model based on the plurality of images and the plurality of modified poses. In some embodiments, method 1900 further includes generating a 3d model based the plurality of images, the plurality of poses, and the modified coordinate system.

Figure 22:
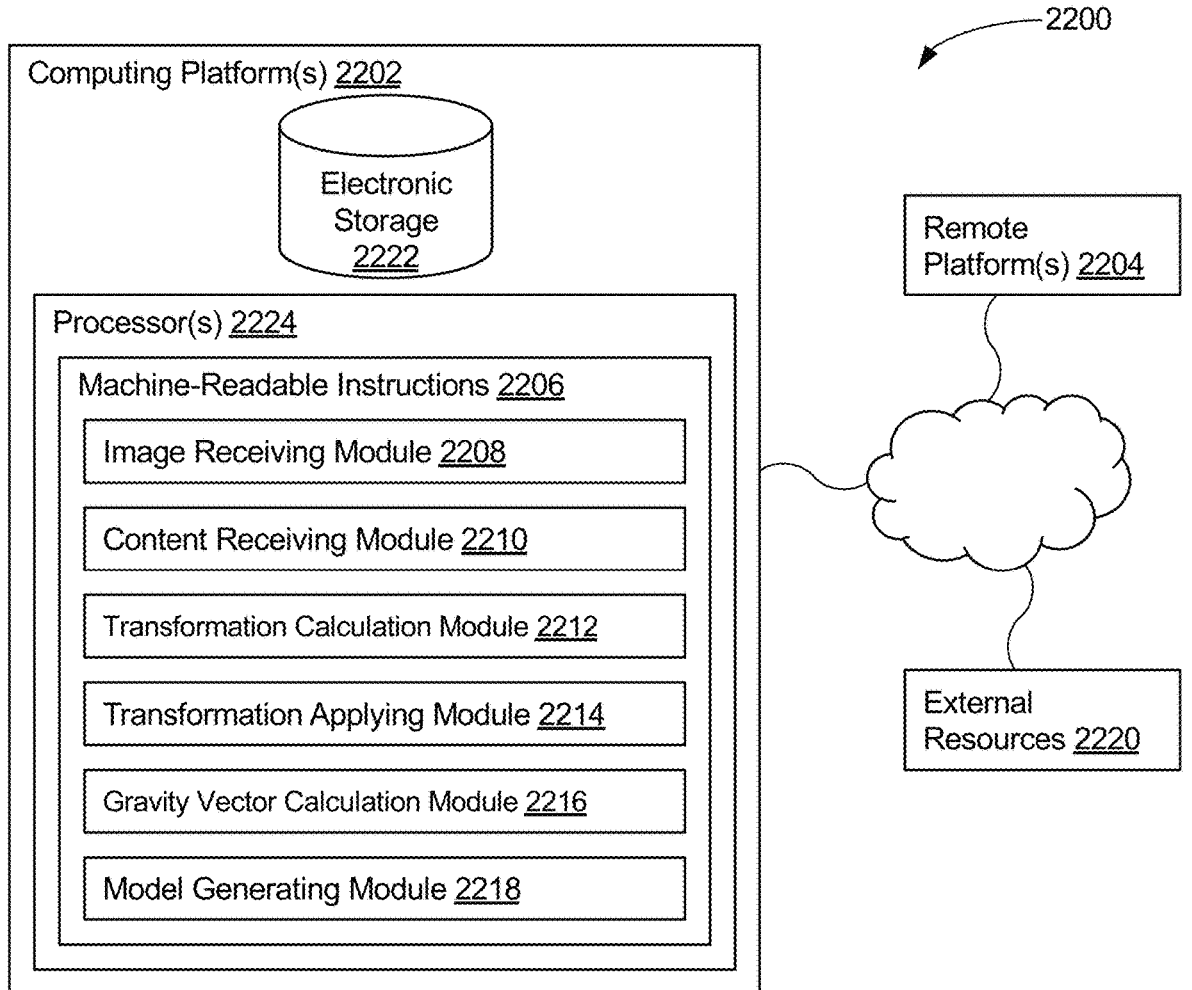
FIG. 22 illustrates a system configured for calculating an alignment transformation, according to some embodiments.

FIG. 22 illustrates a system 2200 configured for calculating an alignment transformation, in accordance with one or more implementations. In some implementations, system 2200 may include one or more computing platforms 2202. Computing platform(s) 2202 may be configured to communicate with one or more remote platforms 2204 according to a client/server architecture, a peer-to-peer architecture, and/or other architectures. Remote platform(s) 2204 may be configured to communicate with other remote platforms via computing platform(s) 2202 and/or according to a client/server architecture, a peer-to-peer architecture, and/or other architectures. Users may access system 2200 via remote platform(s) 2204.

Computing platform(s) 2202 may be configured by machine-readable instructions 2206. Machine-readable instructions 2206 may include one or more instruction modules. The instruction modules may include computer program modules. The instruction modules may include one or more of image receiving module 2208, content receiving module 2210, transformation calculation module 2212, transformation applying module 2214, gravity vector calculation module 2216, model generating module 2218, and/or other instruction modules.

Image receiving module 2208 may be configured to receive a plurality of images and a plurality of poses associated with the plurality of images.

Content receiving module 2210 may be configured to receive a plurality of 3d content associated with the plurality of images and a plurality of rotation matrices associated with the plurality of 3d content. In some implementations, the plurality of 3d content may include 3d geometry. In some implementations, the plurality of 3d content may include wall segments. In some implementations, the plurality of rotation matrices define rotation transformations between the plurality of 3d content and the plurality of images.

Transformation calculation module 2212 may be configured to calculate an alignment transformation based on the plurality of rotation matrices. Calculating the alignment transformation may include calculating a dominant normal vector based on a plurality of normal vectors of the plurality of rotation matrices, calculating a cross product between a dominant gravity vector and the dominant normal vector to define an inverse alignment transformation, and calculating an inverse of the inverse alignment transformation to define the alignment transformation. Calculating the dominant normal vector may include calculating a median of the plurality of normal vectors.

Transformation applying module 2214 may be configured to apply the alignment transformation to the plurality of poses to generate a plurality of modified poses.

Transformation applying module 2214 may be configured to apply the alignment transformation to the plurality of rotation matrices to generate a plurality of aligned rotation matrices. Model generating module 2218 may be configured to generate a 3d model based on the plurality of 3d content and the plurality of aligned rotation matrices.

Gravity vector calculation module 2216 may be configured to calculate the dominant gravity vector based on a plurality of gravity vectors of the plurality of rotation matrices. In some implementations, calculating the dominant gravity vector may include calculating a median of the plurality of gravity vectors. In some implementations, calculating the dominant gravity vector may include calculating an average of the plurality of gravity vectors.

Model generating module 2218 may be configured to generate a 3d model based on the plurality of images and the plurality of modified poses.

Model generating module 2218 may be configured to generate a 2d model based on a top-down view of the 3d model.

In some implementations, computing platform(s) 2202, remote platform(s) 2204, and/or external resources 2220 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 2202, remote platform(s) 2204, and/or external resources 2220 may be operatively linked via some other communication media.

A given remote platform 2204 may include one or more processors configured to execute computer program modules. The computer program modules may be configured to enable an expert or user associated with the given remote platform 2204 to interface with system 2200 and/or external resources 2220, and/or provide other functionality attributed herein to remote platform(s) 2204. By way of non-limiting example, a given remote platform 2204 and/or a given computing platform 2202 may include one or more of a server, a desktop computer, a laptop computer, a handheld computer, a tablet computing platform, a NetBook, a Smartphone, a gaming console, and/or other computing platforms.

External resources 2220 may include sources of information outside of system 2200, external entities participating with system 2200, and/or other resources. In some implementations, some or all of the functionality attributed herein to external resources 2220 may be provided by resources included in system 2200.

Computing platform(s) 2202 may include electronic storage 2222, one or more processors 2224, and/or other components. Computing platform(s) 2202 may include communication lines, or ports to enable the exchange of information with a network and/or other computing platforms. Illustration of computing platform(s) 2202 in FIG. 22 is not intended to be limiting. Computing platform(s) 2202 may include a plurality of hardware, software, and/or firmware components operating together to provide the functionality attributed herein to computing platform(s) 2202. For example, computing platform(s) 2202 may be implemented by a cloud of computing platforms operating together as computing platform(s) 2202.

Electronic storage 2222 may comprise non-transitory storage media that electronically stores information. The electronic storage media of electronic storage 2222 may include one or both of system storage that is provided integrally (i.e., substantially non-removable) with computing platform(s) 2202 and/or removable storage that is removably connectable to computing platform(s) 2202 via, for example, a port (e.g., a USB port, a firewire port, etc.) or a drive (e.g., a disk drive, etc.). Electronic storage 2222 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 2222 may include one or more virtual storage resources (e.g., cloud storage, a virtual private network, and/or other virtual storage resources). Electronic storage 2222 may store software algorithms, information determined by processor(s) 2224, information received from computing platform(s) 2202, information received from remote platform(s) 2204, and/or other information that enables computing platform(s) 2202 to function as described herein.

Processor(s) 2224 may be configured to provide information processing capabilities in computing platform(s) 2202. As such, processor(s) 2224 may include one or more of a digital processor, an analog processor, a digital circuit designed to process information, an analog circuit designed to process information, a state machine, and/or other mechanisms for electronically processing information. Although processor(s) 2224 is shown in FIG. 22 as a single entity, this is for illustrative purposes only. In some implementations, processor(s) 2224 may include a plurality of processing units. These processing units may be physically located within the same device, or processor(s) 2224 may represent processing functionality of a plurality of devices operating in coordination. Processor(s) 2224 may be configured to execute modules 2208, 2210, 2212, 2214, 2216, and/or 2218, and/or other modules. Processor(s) 2224 may be configured to execute modules 2208, 2210, 2212, 2214, 2216, and/or 2218, and/or other modules by software; hardware; firmware; some combination of software, hardware, and/or firmware; and/or other mechanisms for configuring processing capabilities on processor(s) 2224. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 2208, 2210, 2212, 2214, 2216, and/or 2218 are illustrated in FIG. 22 as being implemented within a single processing unit, in implementations in which processor(s) 2224 includes multiple processing units, one or more of modules 2208, 2210, 2212, 2214, 2216, and/or 2218 may be implemented remotely from the other modules. The description of the functionality provided by the different modules 2208, 2210, 2212, 2214, 2216, and/or 2218 described below is for illustrative purposes, and is not intended to be limiting, as any of modules 2208, 2210, 2212, 2214, 2216, and/or 2218 may provide more or less functionality than is described. For example, one or more of modules 2208, 2210, 2212, 2214, 2216, and/or 2218 may be eliminated, and some or all of its functionality may be provided by other ones of modules 2208, 2210, 2212, 2214, 2216, and/or 2218. As another example, processor(s) 2224 may be configured to execute one or more additional modules that may perform some or all of the functionality attributed below to one of modules 2208, 2210, 2212, 2214, 2216, and/or 2218.

Figure 23:
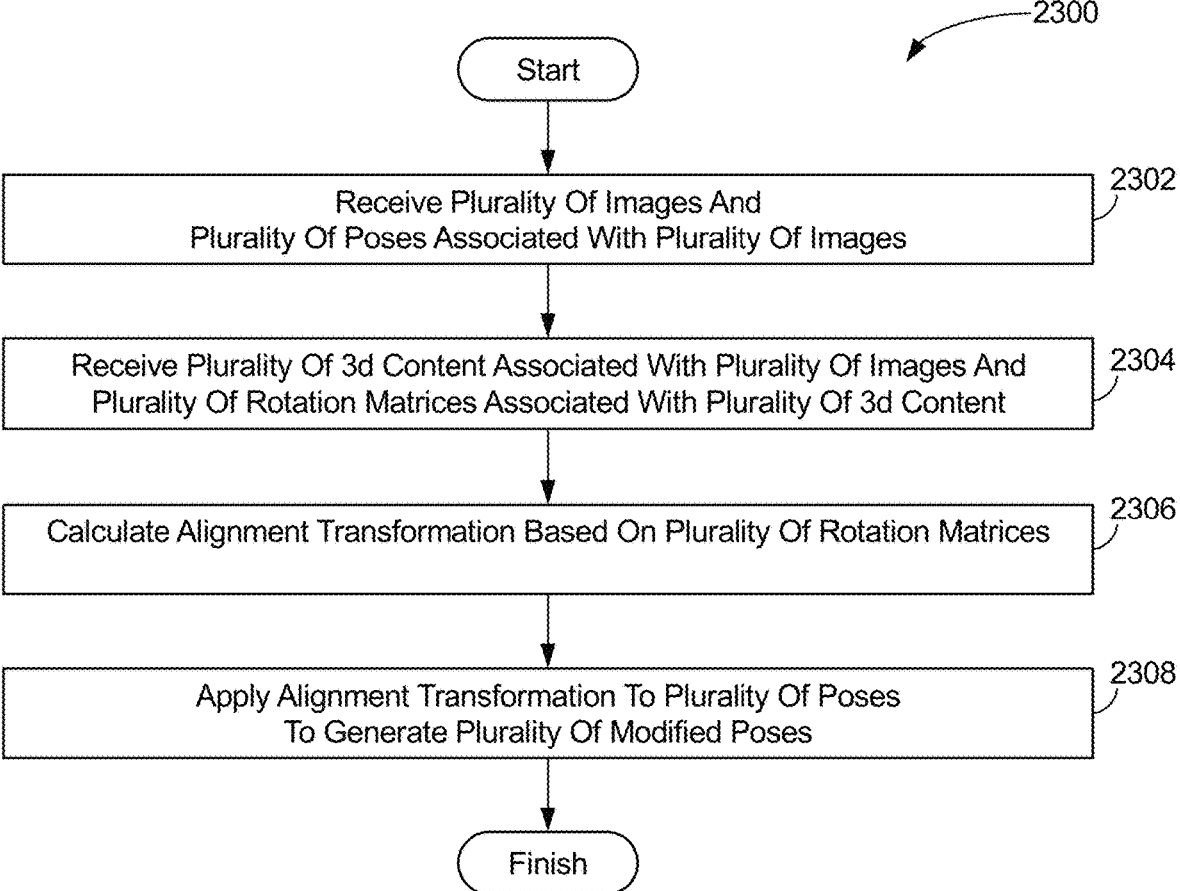
FIG. 23 illustrates a method for calculating an alignment transformation, according to some embodiments.

FIG. 23 illustrates a method 2300 for calculating an alignment transformation, in accordance with one or more implementations. The operations of method 2300 presented below are intended to be illustrative. In some implementations, method 2300 may be accomplished with one or more additional operations not described, and/or without one or more of the operations discussed. Additionally, the order in which the operations of method 2300 are illustrated in FIG. 23 and described below is not intended to be limiting.

In some implementations, method 2300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2300 in response to instructions stored electronically on an electronic storage medium. The one or more processing devices may include one or more devices configured through hardware, firmware, and/or software to be specifically designed for execution of one or more of the operations of method 2300.

An operation 2302 may include receiving a plurality of images and a plurality of poses associated with the plurality of images. The plurality of images and the plurality of pose may be associated with a capture coordinate system. Operation 2302 may be performed by one or more hardware processors configured by machine-readable instructions including a module that is the same as or similar to image receiving module 2208, in accordance with one or more implementations. In some embodiments, the plurality of poses associated with the plurality of images are within a capture coordinate system. In some embodiments, the capture coordinate system includes an origin and a plurality of axes: x-axis, y-axis, and z-axis.

An operation 2304 may include receiving a plurality of 3d content associated with the plurality of images and a plurality of rotation matrices associated with the plurality of 3d content. Operation 2304 may be performed by one or more hardware processors configured by machine-readable instructions including a module that is the same as or similar to content receiving module 2210, in accordance with one or more implementations. In some embodiments, the 3d content includes 3d geometry. In some embodiments, the 3d content includes wall segments. In some embodiments, the plurality of rotation matrices define rotation transformations between the plurality of 3d content and the plurality of images. In some embodiments, the plurality of rotation matrices define rotation transformations between the plurality of 3d content and the capture coordinate system, for example the origin of the capture coordinate system, the axes of the capture coordinate system, or both.

An operation 2306 may include calculating an alignment transformation based on the plurality of rotation matrices. Calculating the alignment transformation may include calculating a dominant normal vector based on a plurality of normal vectors of the plurality of rotation matrices, calculating a cross product between a dominant gravity vector and the dominant normal vector to define an inverse alignment transformation, and calculating an inverse of the inverse alignment transformation to define the alignment transformation. Operation 2306 may be performed by one or more hardware processors configured by machine-readable instructions including a module that is the same as or similar to transformation calculation module 2212, in accordance with one or more implementations. In some embodiments, calculating the dominant normal vector includes calculating a median of the plurality of normal vectors. In some embodiments, calculating the dominant gravity vector is based on a plurality of gravity vectors of the plurality of rotation matrices. In some embodiments, calculating the dominant gravity vector includes calculating a median of the plurality of gravity vectors. In some embodiments, calculating the dominant gravity vector includes calculating an average of the plurality of gravity vectors.

In some embodiments, calculating the alignment transformation is based on differences between the z-axis of the capture coordinate system and the dominant gravity vector, the y-axis of the capture coordinate system and the dominant normal vector, and the x-axis of the capture coordinate system and inverse of the cross-product of the dominant gravity vector and the dominant normal vector. In some embodiments, the differences are rotational differences.

An operation 2308 may include applying the alignment transformation to the plurality of poses to generate a plurality of modified poses. Operation 2308 may be performed by one or more hardware processors configured by machine-readable instructions including a module that is the same as or similar to transformation applying module 2214, in accordance with one or more implementations.

In some embodiments, operation 2312 may include applying the alignment transformation to the capture coordinate system to generate a modified coordinate system. In some embodiments, applying the alignment transformation to the capture coordinate system may include applying the alignment transformation to the axes of the capture coordinate system. In some embodiments, the modified coordinate system is a modeling coordinate system.

In some embodiments, method 2300 may further include applying the alignment transformation to the plurality of rotation matrices to generate a plurality of aligned rotation matrices, and generating a 3d model based on the plurality of 3d content and the plurality of aligned rotation matrices. In some embodiments, method 2300 may further include generating a 2d model based on a top-down view of the 3d model.

In some embodiments, method 2300 may further include generating a 3d model based on the plurality of images and the plurality of modified poses. In some embodiments, method 2300 may further include generating a 2d model based on a top-down view of the 3d model.

In some embodiments, method 2300 may further include generating a 3d model based on the plurality of images and the modified coordinate system. In some embodiments, method 2300 may further include generating a 2d model based on a top-down view of the 3d model.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A method for generating a three-dimensional coordinate system, the method comprising:
   receiving a first image and an associated first camera pose comprising a first camera location and a first camera orientation, wherein the first image and the first camera pose are associated with a capture coordinate system;
   receiving a second image and an associated second camera pose comprising a second camera location and a second camera orientation, wherein the second image and the second camera pose are associated with the capture coordinate system;
   receiving a first point in the first image;
   receiving a second point in the second image, wherein the second point corresponds to the first point;
   receiving a first two-dimensional (2d) line segment in the first image, wherein a first end point of the first 2d line segment is the first point, and wherein the first 2d line segment is colinear with the first point;
   generating an origin for a first three-dimensional (3d) coordinate system based on the first camera pose, the second camera pose, the first point, the second point, and the first 2d line segment by projecting the first point and second point onto a first ground plane, projecting the first camera location and second camera location onto the first ground plane and setting the origin at an intersection of a first line connecting the projected first camera location and projected first point and a second line connecting the projected second camera location and projected second point; and
   generating a 3d line segment based on the first 3d coordinate system and the first 2d line segment.

2. The method of claim 1, wherein the first 2d line segment corresponds to a real-world object depicted in the first image.

3. The method of claim 1, wherein the first 2d line segment corresponds to an attribute of the first image.

4. The method of claim 1, wherein the first 2d line segment is horizontal relative to a ground plane based on the first image.

5. The method of claim 1, wherein generating the first 3d coordinate system further comprises projecting the origin of the first 3d coordinate system orthogonally relative to the first ground plane based on the first point.

6. The method of claim 5, wherein generating the first 3d coordinate system further comprises rotating axes of the first 3d coordinate system based on the first 2d line segment.

7. The method of claim 6, wherein rotating the axes of the first 3d coordinate system is further based on a slope of the first 2d line segment.

8. The method of claim 6, wherein rotating the axes of the first 3d coordinate system comprises aligning an axis of the axes of the first 3d coordinate system with the first 2d line segment.

9. The method of claim 8, wherein the aligned axis of the axes of the first 3d coordinate system is parallel with the first 2d line segment.

10. The method of claim 6, wherein rotating the axes of the first 3d coordinate system is further based on a gravity vector associated with the first image.

11. The method of claim 1, further comprising:
    generating a 3d model with reference to the first 3d coordinate system.

12. The method of claim 11, wherein generating the 3d model is based on a plurality of images including the first image and the second image.

13. The method of claim 11, wherein the 3d model comprises the 3d line segment.

14. The method of claim 8, further comprising:
    receiving a third image and an associated third camera pose comprising a third camera location and a third camera orientation, wherein the third image and the third camera pose are associated with the capture coordinate system;
    receiving a fourth image and an associated fourth camera pose comprising a fourth camera location and a fourth camera orientation, wherein the fourth image and the fourth camera pose are associated with the capture coordinate system;
    receiving a third point in the third image, wherein the third point corresponds to the first point;
    receiving a fourth point in the fourth image, wherein the fourth point corresponds to the first point;
    receiving a second 2d line segment in the third image, wherein a first end point of the second 2d line segment is the third point, and wherein the second 2d line segment is colinear with the third point; and
    generating an origin for a second 3d coordinate system based on the third camera pose, the fourth camera pose, the third point, the fourth point, and the second 2d line segment by projecting the third point and fourth point onto a second ground plane, projecting the third camera location and fourth camera location onto the second ground plane and setting the origin at an intersection of a third line connecting the projected third camera location and projected third point and a fourth line connecting the projected fourth camera location and projected fourth point.

15. The method of claim 14, wherein generating the second 3d coordinate system further comprises projecting the origin of the second 3d coordinate system orthogonally relative to the second ground plane based on the third point.

16. The method of claim 15, wherein generating the second 3d coordinate system further comprises rotating axes of the second 3d coordinate system based on the second 2d line segment.

17. The method of claim 16, wherein rotating the axes of the second 3d coordinate system comprises aligning an axis of the axes of the second 3d coordinate system with the second 2d line segment.

18. The method of claim 17, wherein the aligned axis of the axes of the second 3d coordinate system is parallel with the second 2d line segment.

19. The method of claim 17, further comprising:
calculating a score based on the alignment of the axis of the axes of the first 3d coordinate system with the first 2d line segment and the alignment of the axis of the axes of the second 3d coordinate system with the second 2d line segment.

20. The method of claim 19, wherein the score quantifies a variation between the alignment of the axis of the axes of the first 3d coordinate system with the first 2d line segment and the alignment of the axis of the axes of the second 3d coordinate system with the second 2d line segment.

*     *     *     *     *